US012392542B2

(12) United States Patent
Schneider et al.

(10) Patent No.: US 12,392,542 B2
(45) Date of Patent: Aug. 19, 2025

(54) REFRIGERATOR

(71) Applicant: Hettich-ONI GmbH & Co. KG, Vlotho (DE)

(72) Inventors: Mark Schneider, Porta Westfalica (DE); Ralf Tofall, Bueckeburg (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 208 days.

(21) Appl. No.: 18/029,153

(22) PCT Filed: Sep. 15, 2021

(86) PCT No.: PCT/EP2021/075320
§ 371 (c)(1),
(2) Date: Mar. 29, 2023

(87) PCT Pub. No.: WO2022/069225
PCT Pub. Date: Apr. 7, 2022

(65) Prior Publication Data

US 2023/0366611 A1 Nov. 16, 2023

(30) Foreign Application Priority Data

Sep. 30, 2020 (DE) ..................... 10 2020 125 604.3

(51) Int. Cl.
*F25D 23/02* (2006.01)
*E05D 3/16* (2006.01)
*E05D 7/04* (2006.01)

(52) U.S. Cl.
CPC ............. *F25D 23/028* (2013.01); *E05D 3/16* (2013.01); *E05D 2003/166* (2013.01);
(Continued)

(58) Field of Classification Search
CPC ... F25D 23/028; F25D 2323/024; E05D 3/16; E05D 2003/166; E05D 2007/0469; E05D 2007/0461; E05Y 2900/31
See application file for complete search history.

(56) References Cited

U.S. PATENT DOCUMENTS 5,339,493 A * 8/1994 MacIntyre ............ E05D 7/0423 16/237
5,471,709 A * 12/1995 Lanzani ................ F25D 23/026 16/302
(Continued)

FOREIGN PATENT DOCUMENTS

AT 506756 B1 * 3/2013 ........... E05D 7/0407
CN 1417443 A * 5/2003 ............. E05D 3/186
(Continued)

OTHER PUBLICATIONS

International Search Report in PCT/EP2021/075320, mailed Jan. 18, 2022.
(Continued)

*Primary Examiner* — Hanh V Tran
(74) *Attorney, Agent, or Firm* — Collard & Roe, P.C.

(57) ABSTRACT

A refrigerator has an appliance body and at least one door pivotably mounted on the appliance body, the door being pivotably supported between a closed position and a maximum open position via at least one multi-pivot hinge and abutting the appliance body in the closed position via at least one seal, wherein the at least one multi-pivot hinge comprises a mounting element supported on the appliance body and a hinge part which is fixed to the door and which are held pivotably against one another via a joint mechanism with a plurality of joint levers, an adjusting device being provided on the mounting element, which has a fastening part fixed to the appliance body and an adjustment element
(Continued)

Figure 1B:
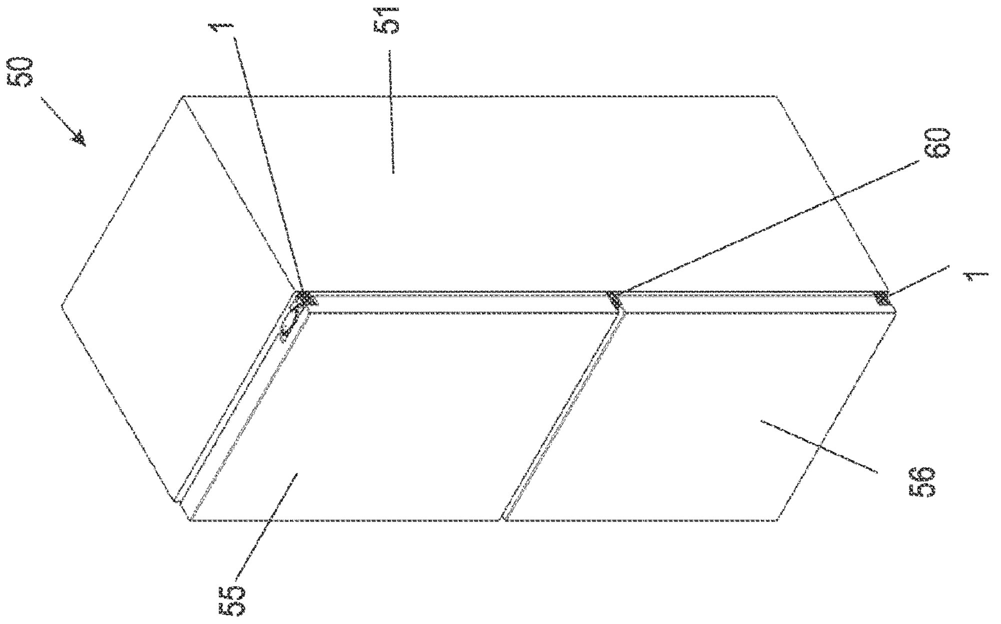

by means of which the position of the mounting element relative to the fastening part can be adjusted in at least one spatial direction.

19 Claims, 24 Drawing Sheets

(52) U.S. Cl.
CPC ... *E05D 2007/0469* (2013.01); *E05Y 2900/31* (2013.01); *F25D 2323/024* (2013.01)

(56) References Cited

U.S. PATENT DOCUMENTS

| | | | | | |
|---|---|---|---|---|---|
| 5,572,768 | A * | 11/1996 | Daul | E05F 3/20 16/337 |
| 6,499,189 | B2 * | 12/2002 | Kondo | H04N 1/00554 16/370 |
| 7,685,678 | B2 * | 3/2010 | Moon | F25D 23/028 16/245 |
| 7,752,709 | B2 | 7/2010 | Moon et al. | |
| 8,225,459 | B2 | 7/2012 | Waltemate et al. | |
| 8,307,502 | B2 * | 11/2012 | Bonomie | E05D 7/04 16/248 |
| 8,511,768 | B2 | 8/2013 | Brachert | |
| 9,389,011 | B2 | 7/2016 | Kim | |
| 9,903,638 | B2 * | 2/2018 | Dubina | E05D 7/02 |
| 12,012,792 | B2 * | 6/2024 | Schneider | E05F 5/006 |
| 2005/0251961 | A1 * | 11/2005 | Liu | E05D 7/0415 16/242 |
| 2008/0168618 | A1 * | 7/2008 | Hottmann | E05F 1/1253 16/50 |
| 2011/0089801 | A1 * | 4/2011 | Bonomie | E05D 7/04 16/249 |
| 2013/0221825 | A1 | 8/2013 | Bonomie et al. | |
| 2013/0239363 | A1 * | 9/2013 | Apur | E05F 5/006 16/50 |
| 2017/0176088 | A1 * | 6/2017 | Richards | F25D 23/028 |
| 2018/0363347 | A1 * | 12/2018 | Chang | E05F 1/1215 |

FOREIGN PATENT DOCUMENTS

| | | | | | |
|---|---|---|---|---|---|
| CN | 2791195 | Y * | 6/2006 | |
| CN | 108661468 | A * | 10/2018 | E05D 3/02 |
| CN | 110094127 | A * | 8/2019 | E05D 3/06 |
| CN | 211 144 123 | U | 7/2020 | |
| DE | 29 04 397 | A1 | 8/1980 | |
| DE | 36 24 965 | A1 | 2/1987 | |
| DE | 4345081 | A1 * | 7/1994 | A47L 15/4261 |
| DE | 103 58 731 | A1 | 7/2005 | |
| DE | 10 2006 018 290 | A1 | 11/2006 | |
| DE | 20 2007 004 621 | U1 | 8/2008 | |
| DE | 11 2013 004 458 | T5 | 5/2015 | |
| DE | 102015120565 | A1 * | 6/2017 | E05D 5/046 |
| DE | 10 2016 112 164 | A1 | 1/2018 | |
| DE | 102016224383 | A1 * | 6/2018 | E05D 3/02 |
| EP | 2589735 | B1 * | 9/2021 | E05D 7/0423 |
| GB | 2 178 791 | A | 2/1987 | |
| JP | S54-152855 | U | 10/1979 | |
| JP | S54-170042 | U | 12/1979 | |
| JP | H029669 | U * | 1/1990 | |
| KR | 20110007986 | U * | 8/2011 | |
| KR | 101526731 | B1 * | 6/2015 | |
| TW | M378960 | U * | 4/2010 | |
| UA | 115453 | C2 * | 11/2017 | |
| WO | 2008/119647 | A1 | 10/2008 | |
| WO | WO-2009127335 | A1 * | 10/2009 | E05D 7/0407 |
| WO | WO-2017089340 | A1 * | 6/2017 | E05D 5/046 |

OTHER PUBLICATIONS

German Search Report dated Apr. 23, 2021 in German Application No. 10 2020 125 604.3 with English translation of relevant parts.

* cited by examiner

REFRIGERATOR

CROSS REFERENCE TO RELATED APPLICATIONS

This application is the National Stage of PCT/EP2021/075320 filed on Sep. 15, 2021, which claims priority under 35 U.S.C. § 119 of German Application No. 10 2020 125 604.3 filed on Sep. 30, 2020, the disclosure of which is incorporated by reference. The international application under PCT article 21 (2) was not published in English.

The present invention relates to a refrigerator having an appliance body and at least one door pivotably mounted on the appliance body, the door being pivotably supported between a closed position and a maximum open position via at least one multi-joint hinge and abutting the appliance body in the closed position via at least one seal, wherein the at least one multi-joint hinge comprises a mounting element supported on the appliance body and a hinge part fixed to the door, the mounting element and the hinge part being pivotably supported against each other via a joint mechanism comprising a plurality of hingedly connected levers.

DE 10 2006 018 290 describes a refrigerator with a height-adjustable door in which a bearing for the door has an adjustment mechanism. The bearing is formed by a pin so that the door can be pivoted about a vertical axis. Refrigerators of this type have the disadvantage that, when the door is being opened, the door rotates only, but does not move forwards, so that it is not possible to install the door in a piece of furniture. The side walls of a piece of furniture protrude over a front side of the appliance body, so that the refrigerator shown there cannot be integrated into a piece of furniture.

Furthermore, there are multi-joint hinges for the suspension of doors on refrigerators, such as those disclosed in WO 2008/119647, in which a hinge part is connected to a mounting plate on the appliance body via a lever mechanism with several hingedly connected levers. With such multi-joint hinges, the door can perform a forward translational motion in addition to a rotational motion during a pivoting motion, so that the refrigerator can be integrated into a furniture body. These multi-joint hinges sometimes have to support heavy weights, which can cause the door to lower during a swivel motion. In addition, manufacturing tolerances can cause problems during assembly.

It is therefore an object of the present invention to create a refrigerator in which a multi-hinged hinge can be better adapted to the respective installation situation.

This object is achieved with a refrigerator having the features of claim 1.

In the refrigerator according to the invention, the pivotable door is held pivotably via at least one multi-joint hinge which is fixed to the appliance via of a mounting element, the mounting element being provided with an adjusting device which comprises a fastening part fixed to the appliance body and an adjustment element by means of which the position of the mounting element relative to the fastening part can be adjusted in at least one spatial direction. This allows an adjustment to be made when the multi-joint hinge is mounted, so that manufacturing tolerances can be compensated for or a lowering of the door after a certain period of operation can be compensated for. In this way, the positioning of the door can be adjusted, especially also regarding a reliable seal against the appliance body in a closed position of the door. Furthermore, the joint pattern can be adjusted precisely and collisions with nearby components can be prevented.

Preferably, the adjustment element can be used to perform a rotational rotary motion and a translational motion of the mounting element can be effected via the rotational motion. The adjustment element can comprise a threaded section which comprises at least one thread from the group of thread types of flat threads, cylindrical threads or conical threads. This allows the mounting element to be steplessly adjustable. This means that fine adjustment can be made by turning the adjustment element.

The adjustment element is preferably rotatable but axially immovable. The adjustment element can be arranged in engagement with an internally threaded insert, which is held non-rotatably on the fastening part. By rotating the adjustment element, the internally threaded insert can be axially displaced relative to the adjustment element, which effects the adjustment process. Instead of a threaded section, an adjusting worm or an eccentric can also be used.

The adjusting device is preferably used to adjust the height of the mounting element relative to the fastening part on the appliance body. The height adjustment enables the door to be aligned in a vertical direction. The adjustment element is preferably also rotatable about a vertical axis to perform a height adjustment. Additionally or alternatively, the adjusting device can also effect a lateral adjustment or a depth adjustment, optionally providing several adjustment mechanisms that are part of the overall adjusting device. Instead of a linear adjustment of the mounting part, a swivelling adjustment can also be provided, for example to change the inclination of the hinge part in the opening position and the swivelling range.

For a stable mounting of the door, the mounting element is preferably U-shaped in cross-section, whereby the fastening part can be adjusted between two legs of the mounting element. The mounting element can be made, for example, as a sheet steel part bent into a U-shape.

Preferably, the mounting element comprises an elongated hole that is aligned parallel to the adjustment direction in the longitudinal direction. This allows the mounting element to be fixed in the mounted position on the one hand to the fastening part and on the other hand to be fixed directly to the body of the device via a further fastening means in order to ensure play-free mounting despite the adjustment mechanism.

Preferably, at least one multi-joint hinge is arranged on the mounting element, optionally also two multi-joint hinges, in order to pivotably support two different doors.

A tool receptable, such as an Allen (Hex) key (socket) or slot, is preferably provided on the adjustment element for adjusting the position of the mounting element.

The multi-joint hinge for holding the door can, for example, be formed as a seven-joint hinge with four levers that are hingedly connected together. A formation as a four-joint hinge or with a different number of joint axes is also possible.

In a preferred embodiment, the multi-joint hinge comprises at least one linear damper with a damper housing and a displaceable piston rod. The damper housing can be fixed in a receptacle on a holding element on a lever of the joint mechanism. The piston rod can then be inserted into the damper housing via an actuating element which is arranged on a further lever of the joint mechanism. The contacting of the actuating element and the piston rod can thereby take place in a damping area which is formed between the closing position of the door and an angular range between 20° to 30° in order to brake the door before reaching the closing position during a closing motion of the door. The further opening range of the door can then be freewheeling in relation to the linear damper.

The holding element for fixing the linear damper preferably has a receptacle for the damper housing on which a stop is provided to support the damper housing. In this way, high damping forces can also be transmitted in confined installation space.

The multi-joint hinge can also be used without a damper.

For a stable formation of the multi-joint hinge, levers can be used which are U-shaped, in particular in cross-section, and which at least partially overlap or interlock with each other in a closed position.

Preferably, the adjusting device comprises at least one rotatable worm, which moves the mounting element translationally by rotation. This allows a comparatively large adjustment path to be achieved, for example between 2 mm to 10 mm.

For an optimised positioning of a door on the refrigerator, the adjusting device can allow an adjustment of the mounting element in at least two different directions. For example, a height adjustment and a lateral adjustment can be carried out via the adjusting device in order to be able to position the door optimally relative to the appliance body, in particular with regard to the closed position.

For a compact design, the adjusting device can have a base plate fixed to the appliance body and at least one adjustment element between the mounting element and the base plate. The mounting element can engage around the adjustment element with guide elements and be held displaceably on the adjustment element. Alternatively, the adjustment element can also embrace the mounting element and guide it in a longitudinal direction. If the adjustment element and the mounting element are held on each other so as to be linearly displaceable, at least one opening can be provided on a base of the mounting element, in which a worm or another adjustment element is rotatably mounted. Then, by rotating the worm, the mounting element can be moved relative to the adjustment element. In addition, the adjustment element can be moved relative to the appliance body via another worm or other adjustment element to enable adjustment in different directions.

Figure 1A:
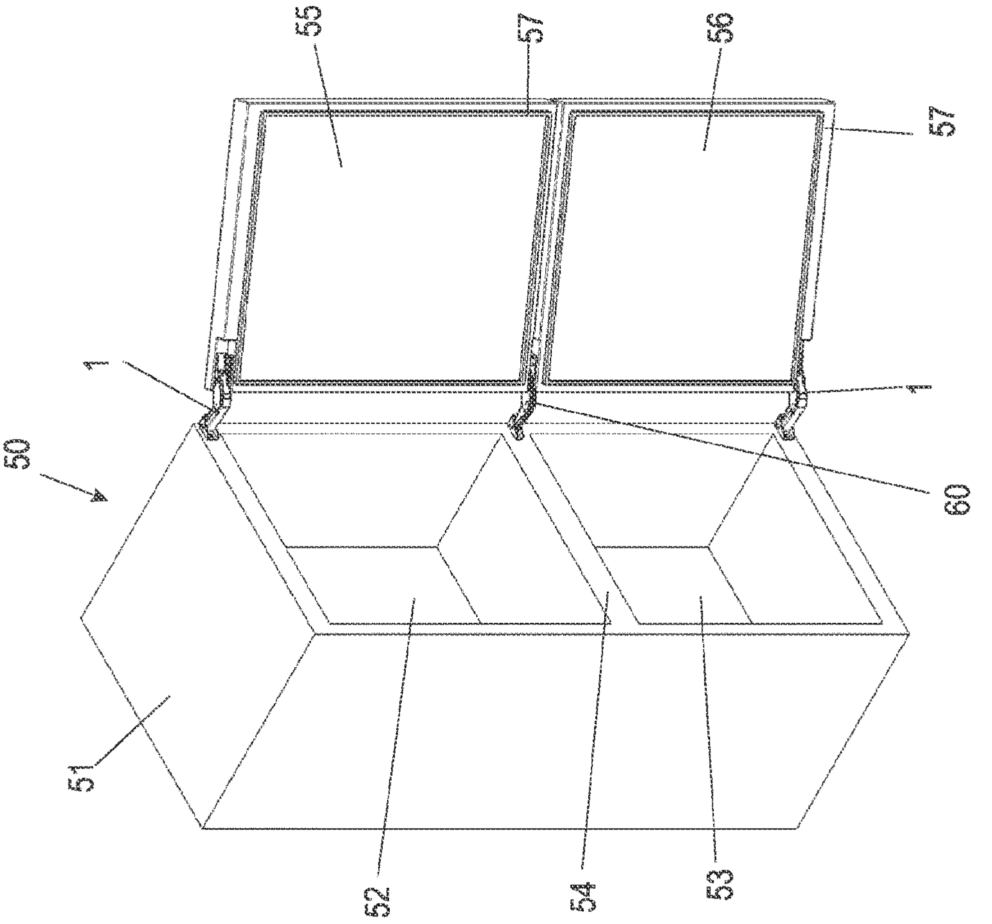
Figure 2B:
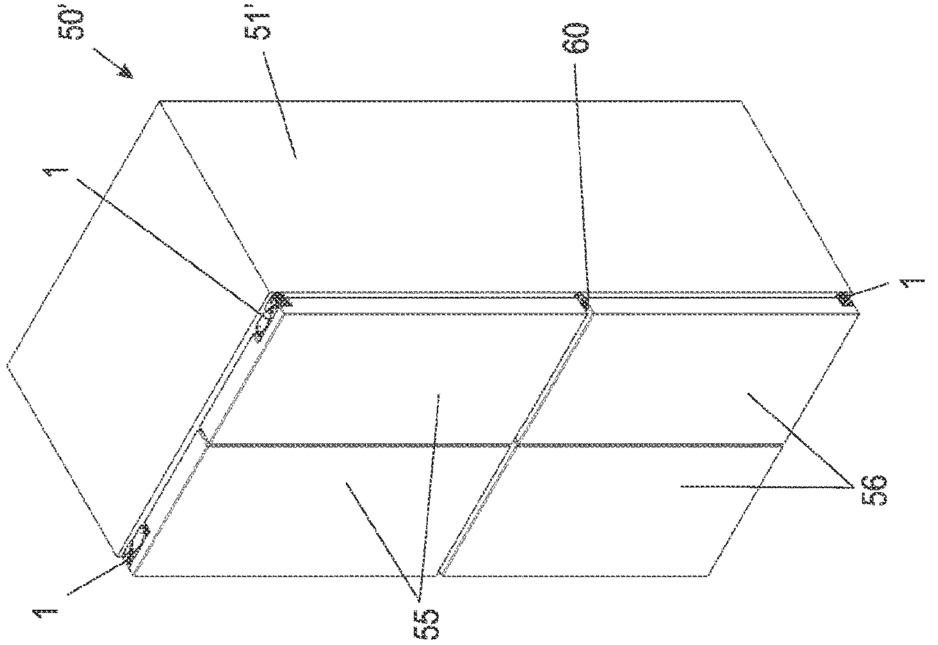
Figure 2A:
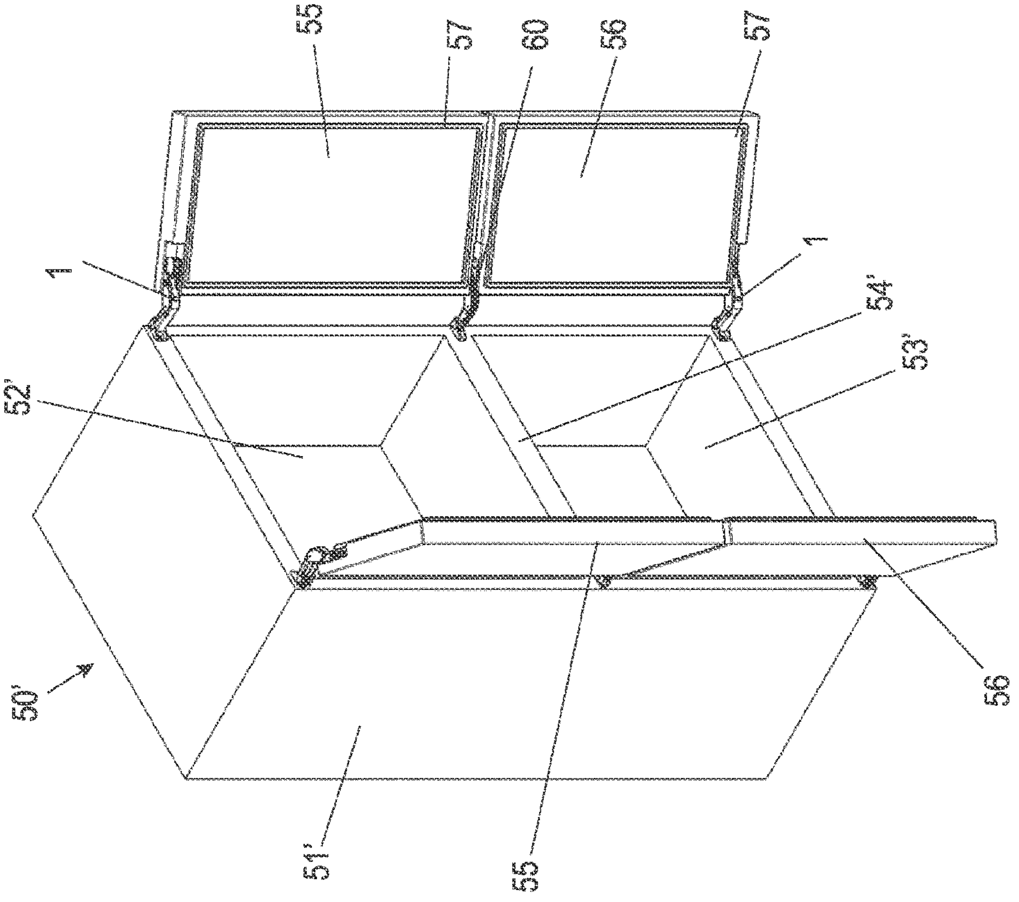
Figure 3B:
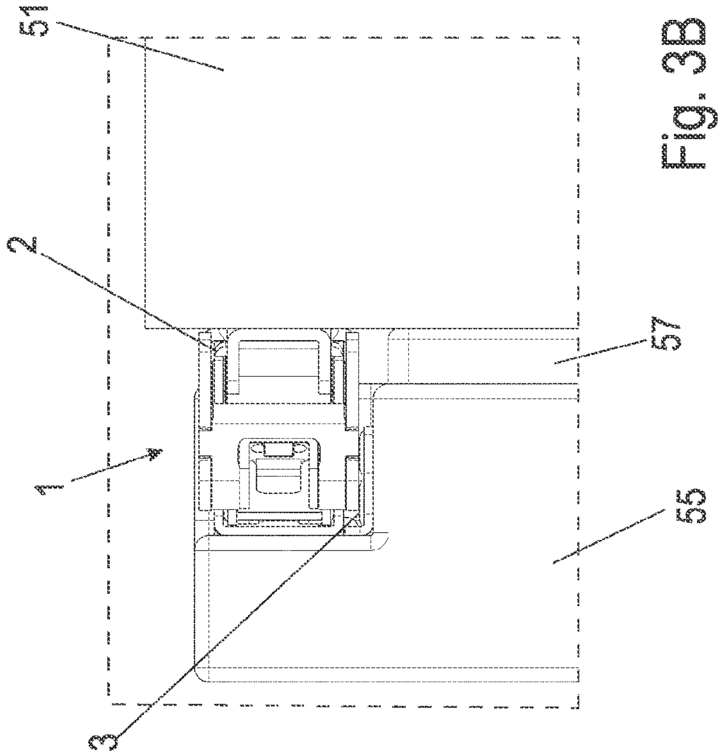
Figure 3A:
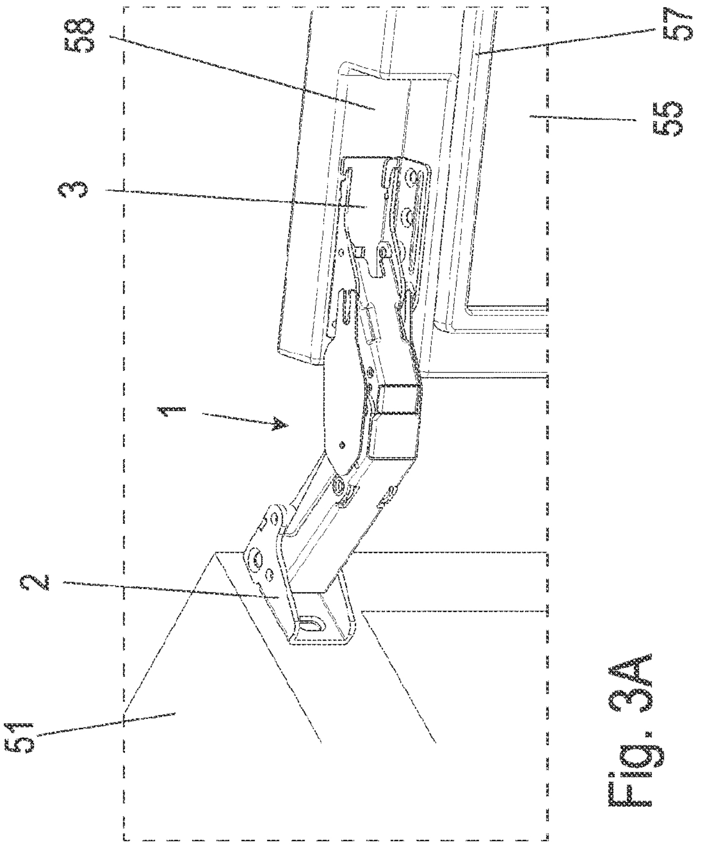
Figure 4:
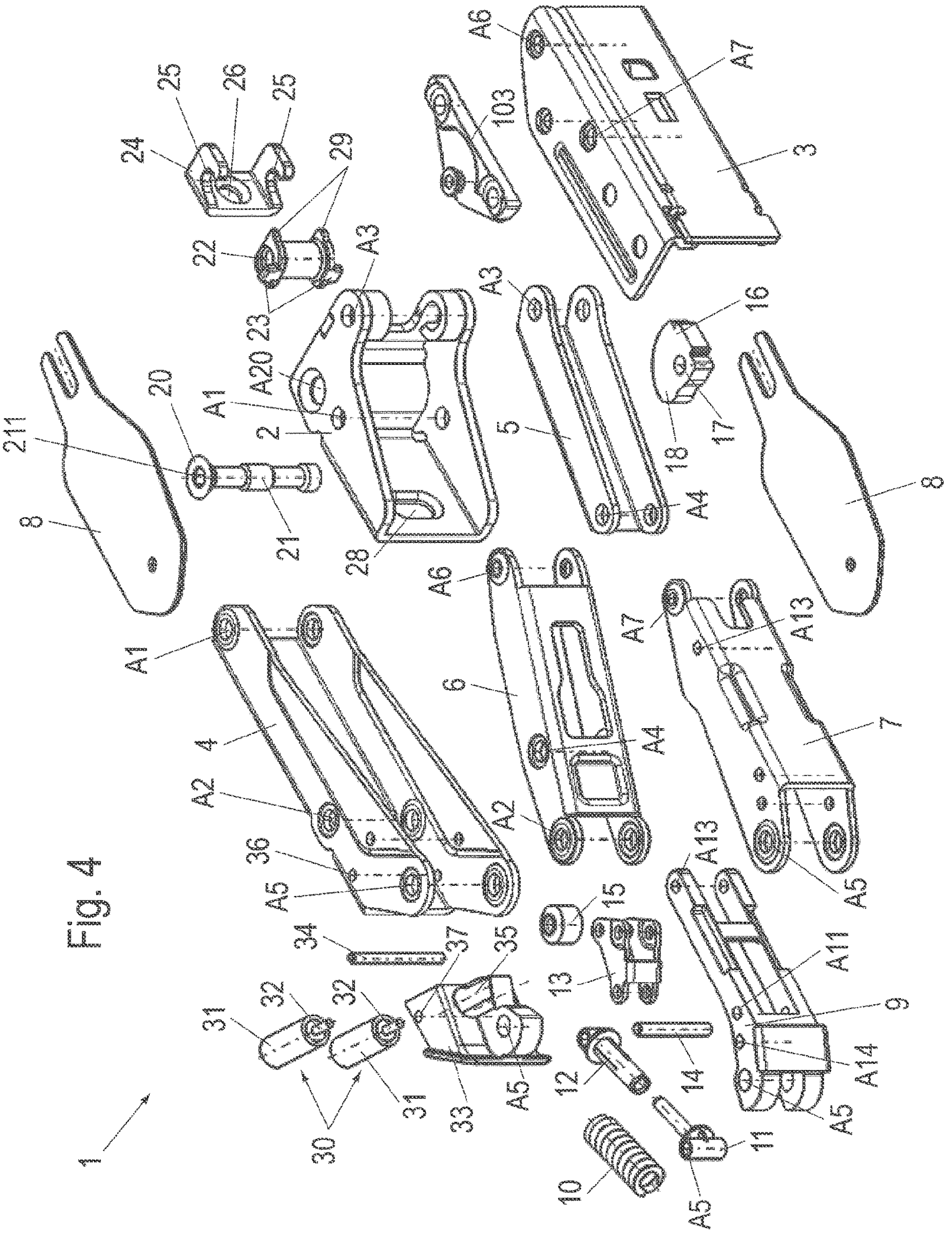
Figure 6B:
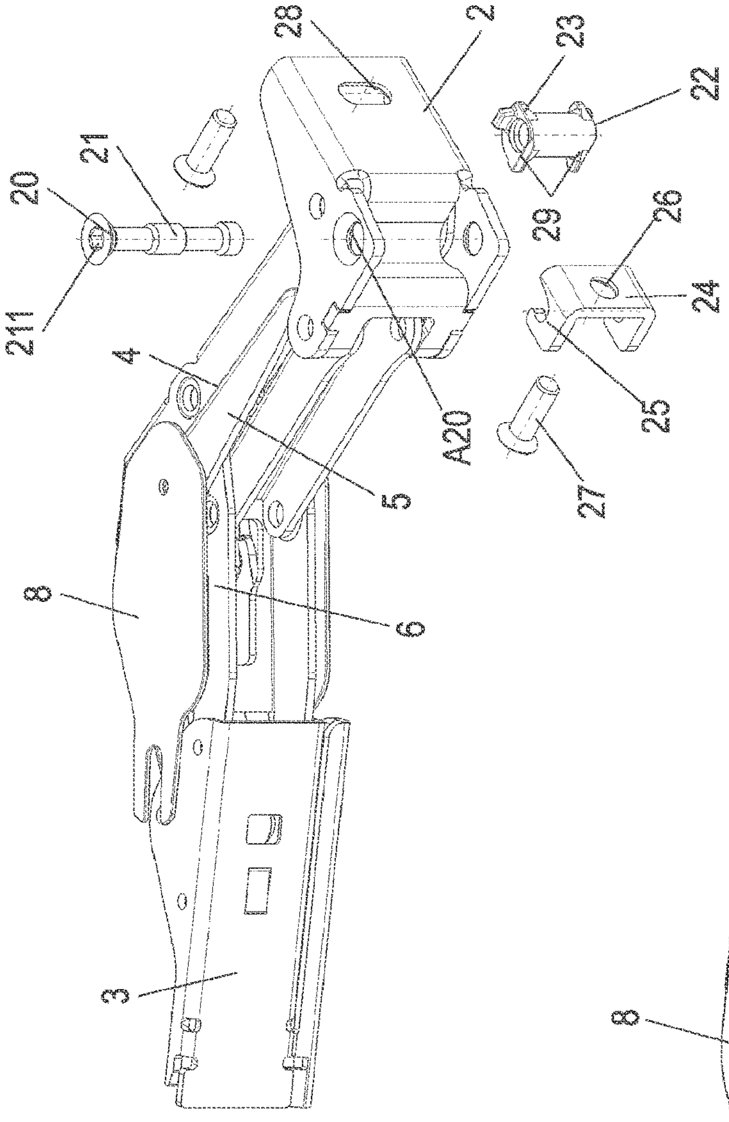
Figure 6A:
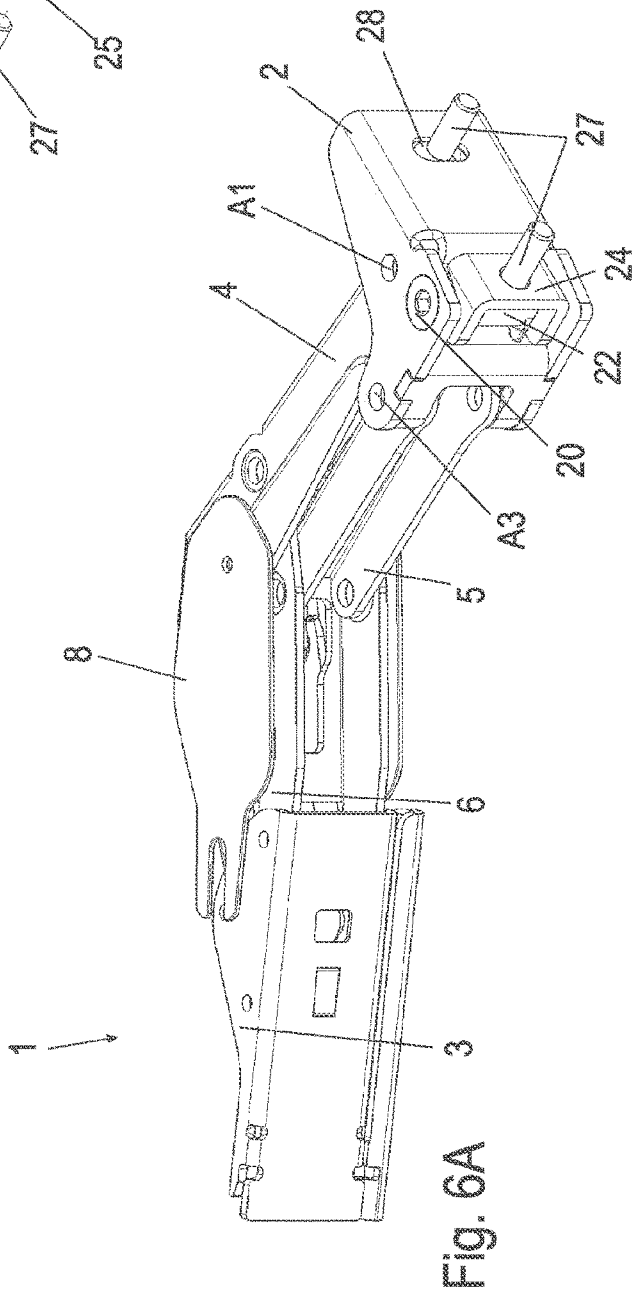
Figure 7B:
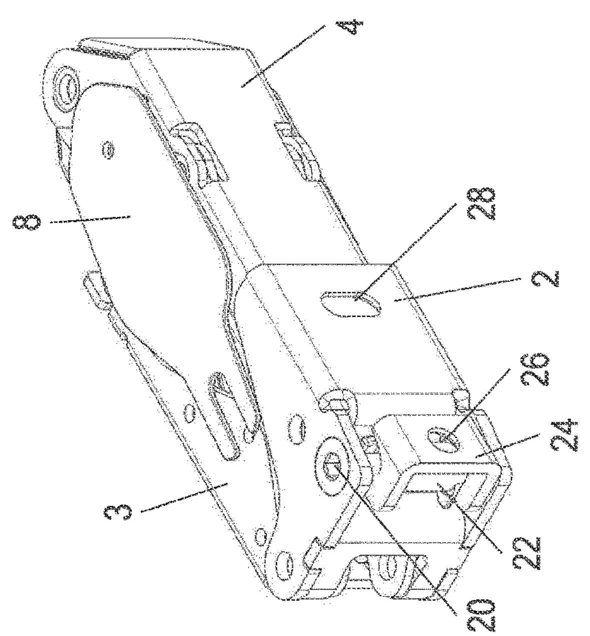
Figure 7C:
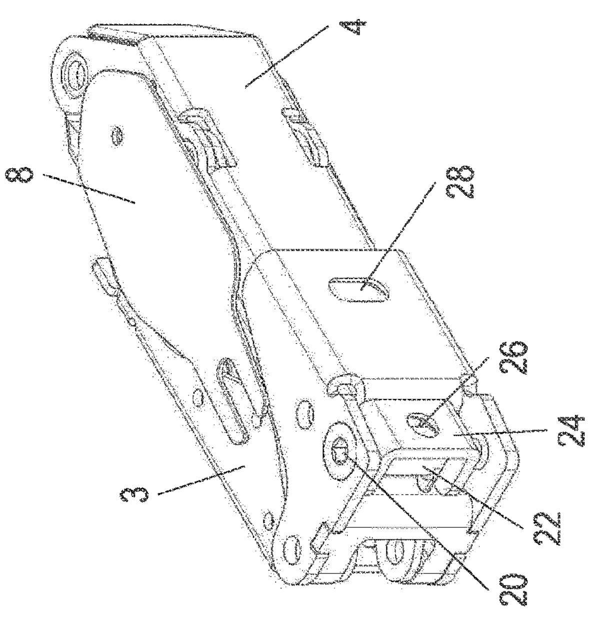
Figure 7A:
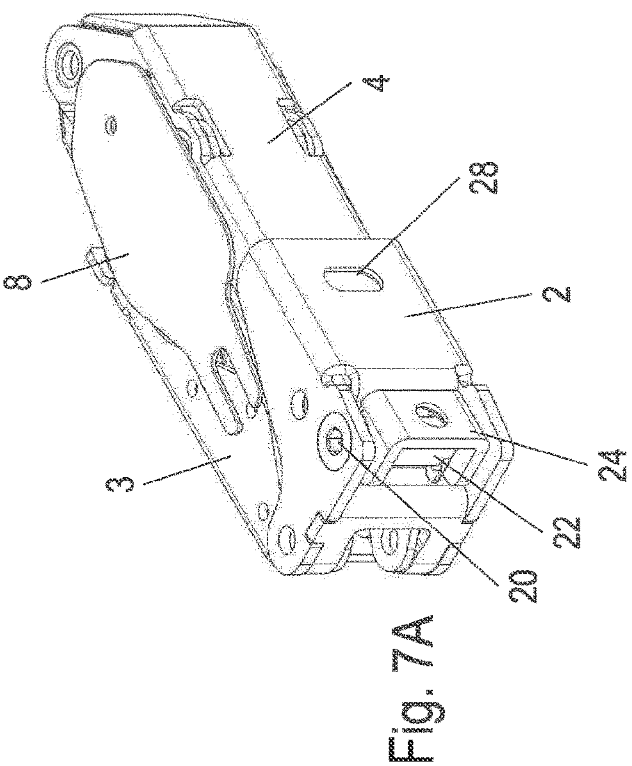
Figure 8A:
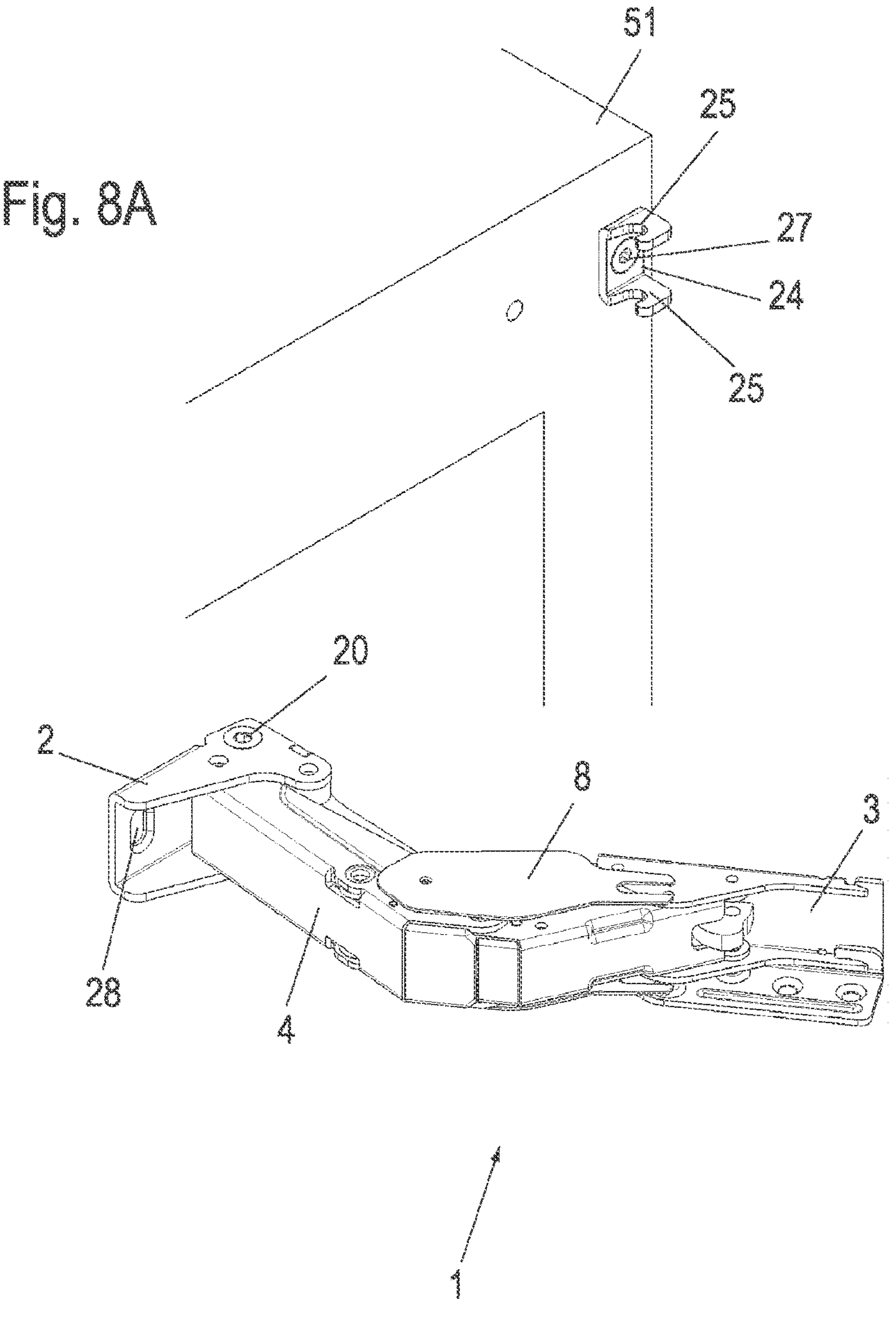
Figure 8C:
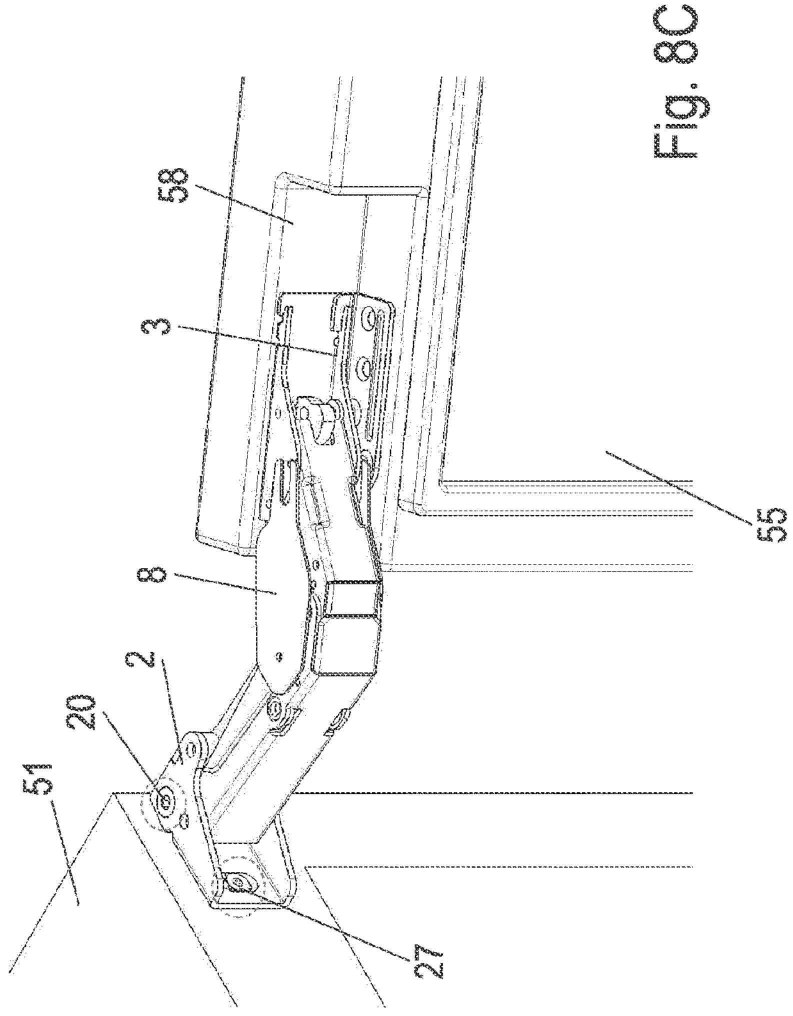
Figure 8B:
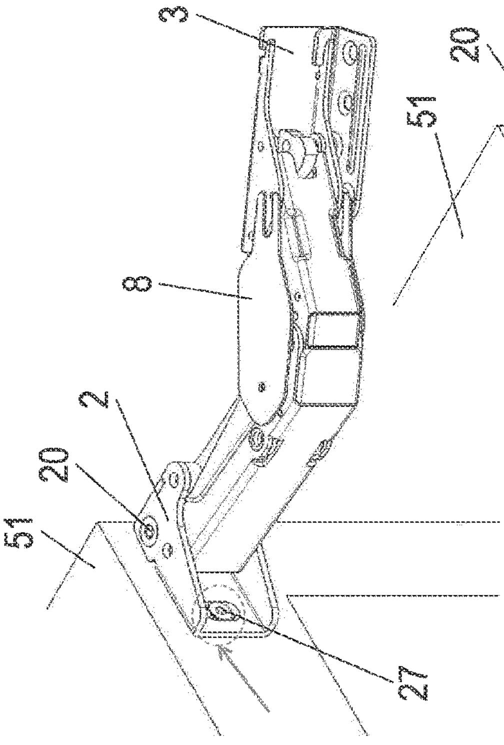

The invention is explained in more detail below by means of an example of an embodiment with reference to the accompanying drawings. It is shown in:

FIGS. 1A and 1B Two views of a refrigerator with two doors according to the invention;

FIGS. 2A and 2B Two views of a refrigerator with four doors according to the invention;

FIGS. 3A and 3B Two views of a refrigerator in the area of a multi-joint hinge;

FIG. 4 An exploded view of the multi-joint hinge;

FIGS. 5A to 5D Multiple views of the multi-joint hinge of FIG. 4 in different positions;

FIGS. 6A and 6B Two views of the multi-joint hinge with the adjustment device;

FIGS. 7A to 7C Several views of the multi-joint hinge in different positions of the adjusting device, and FIGS. 8A to 8C Multiple views of the assembly of the multi-joint hinge.

Figure 9:
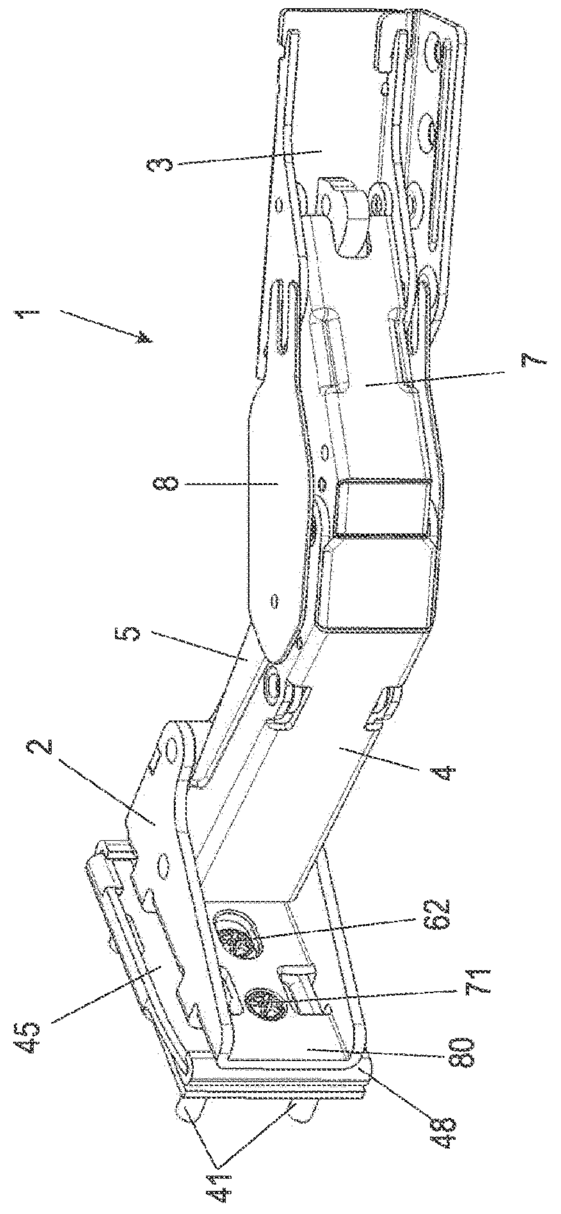
Figure 10A:
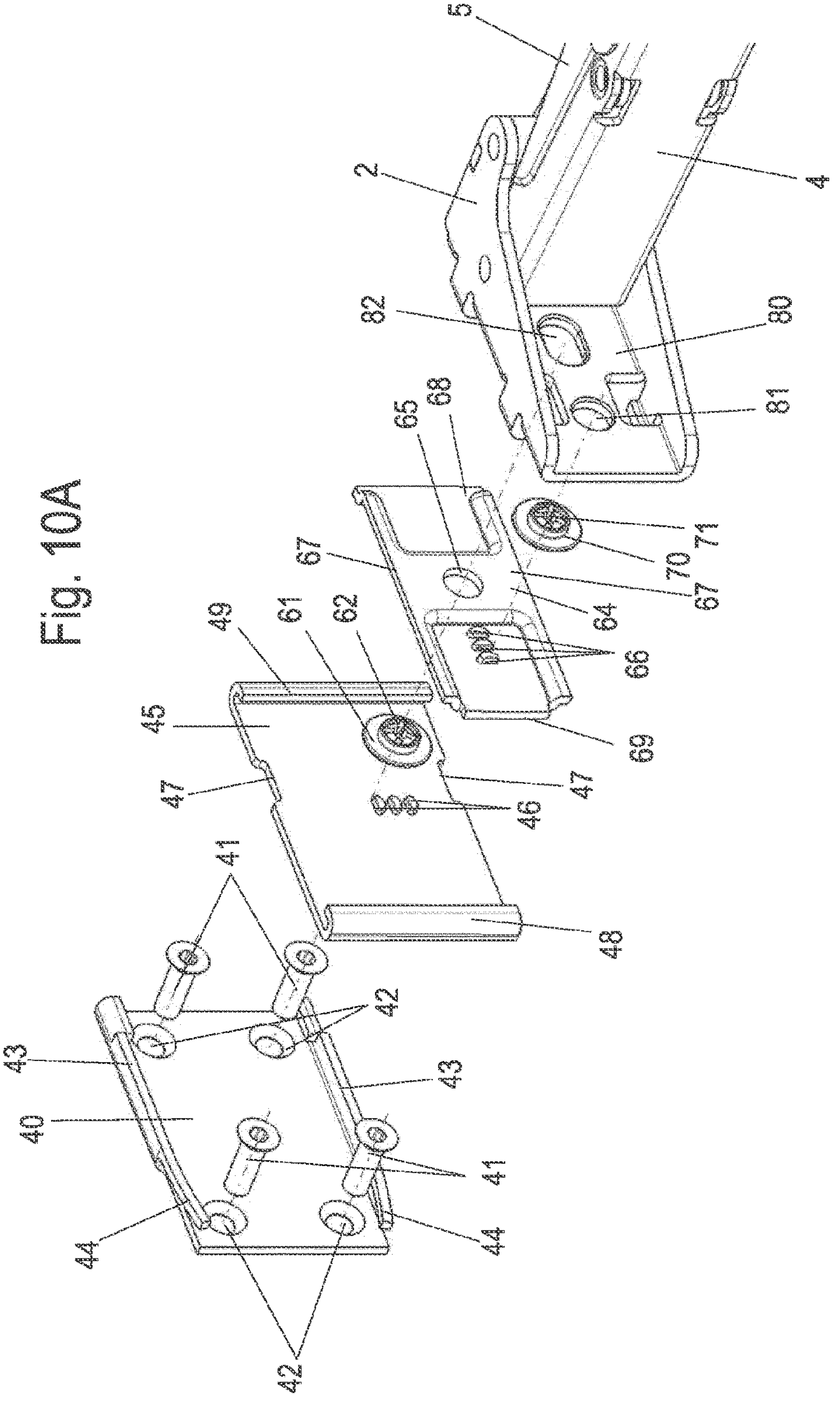
Figure 10B:
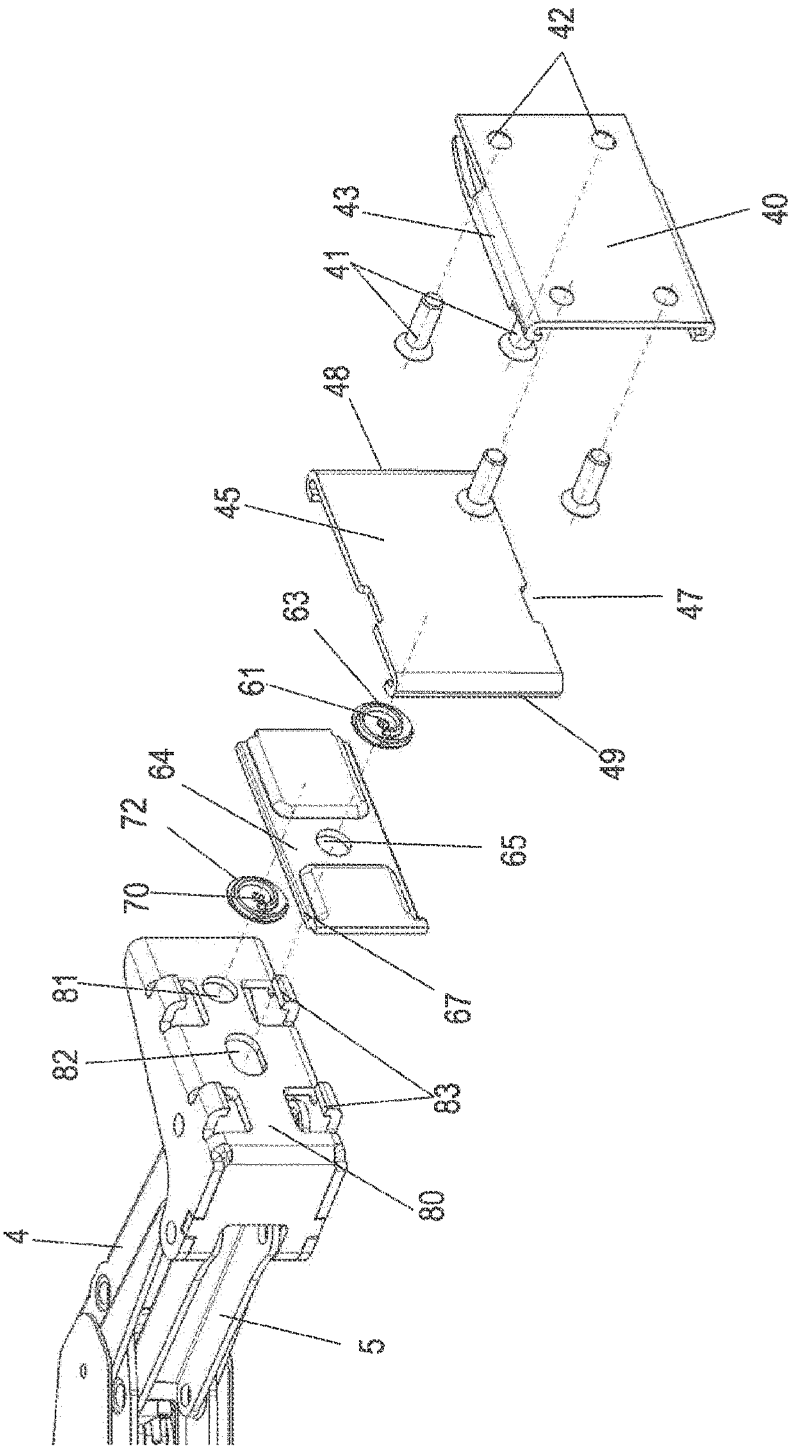
Figure 11A:
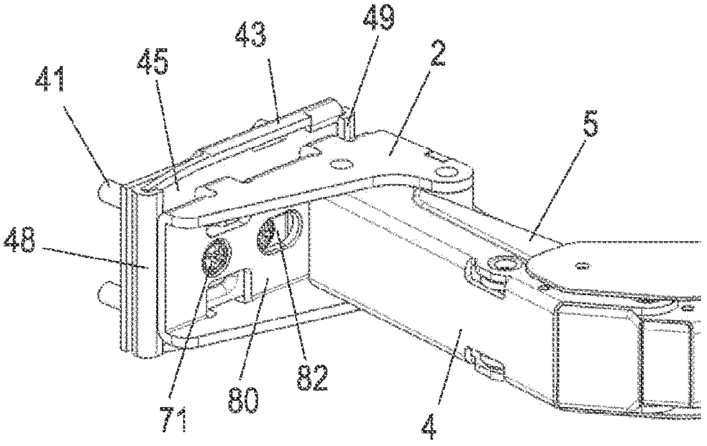
Figure 11B:
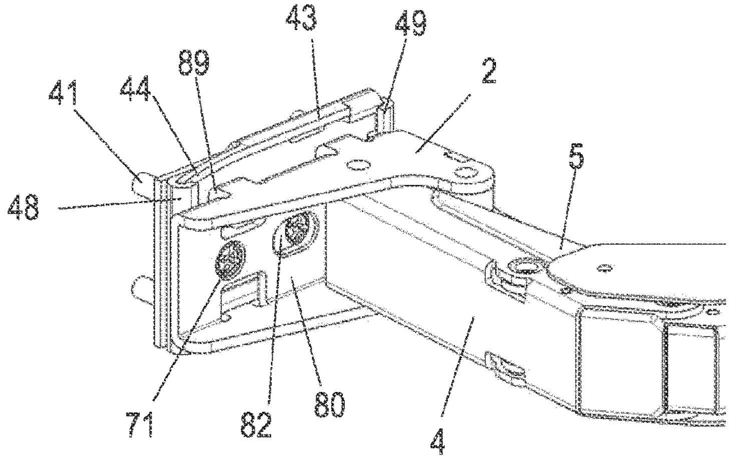
Figure 12A:
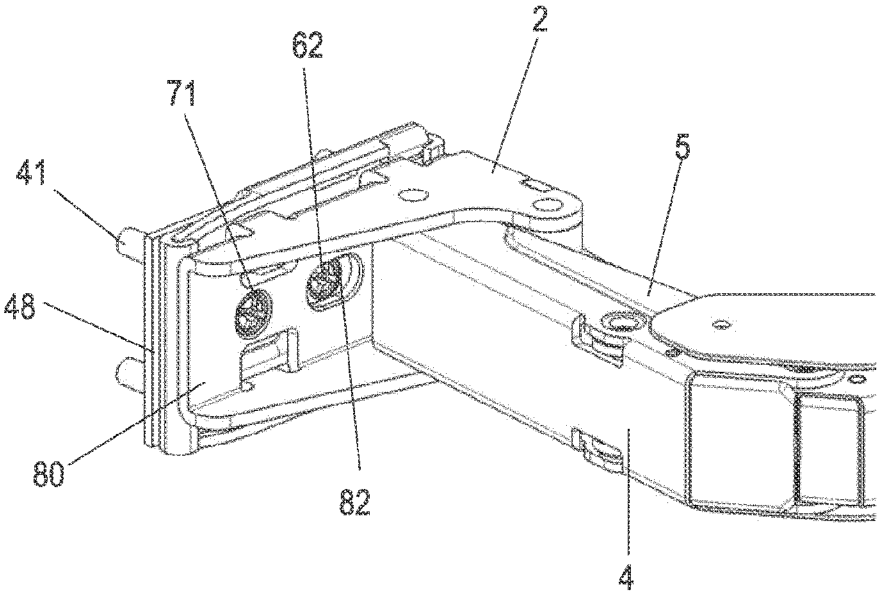
Figure 12B:
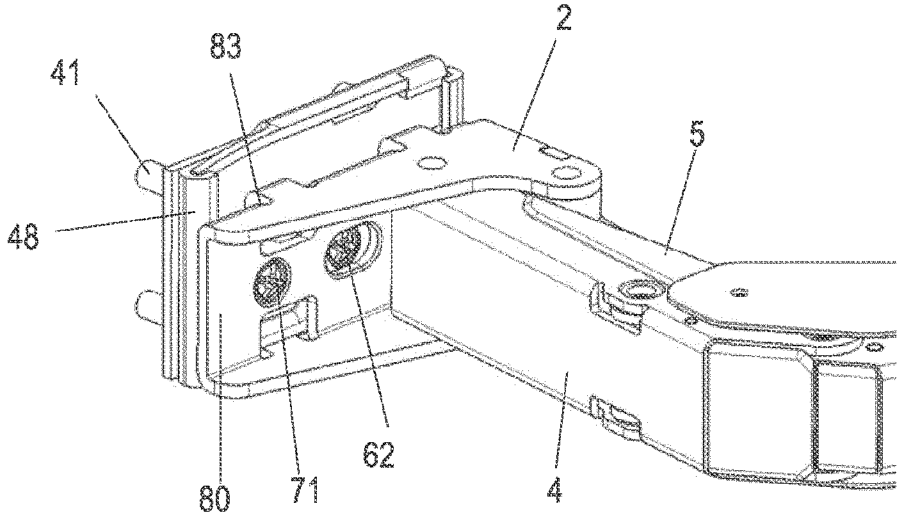
Figure 14:
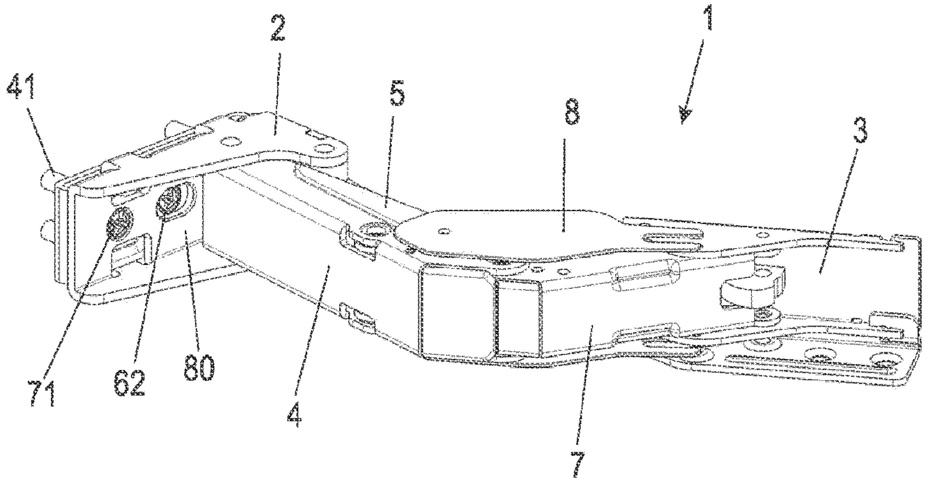
Figure 15A:
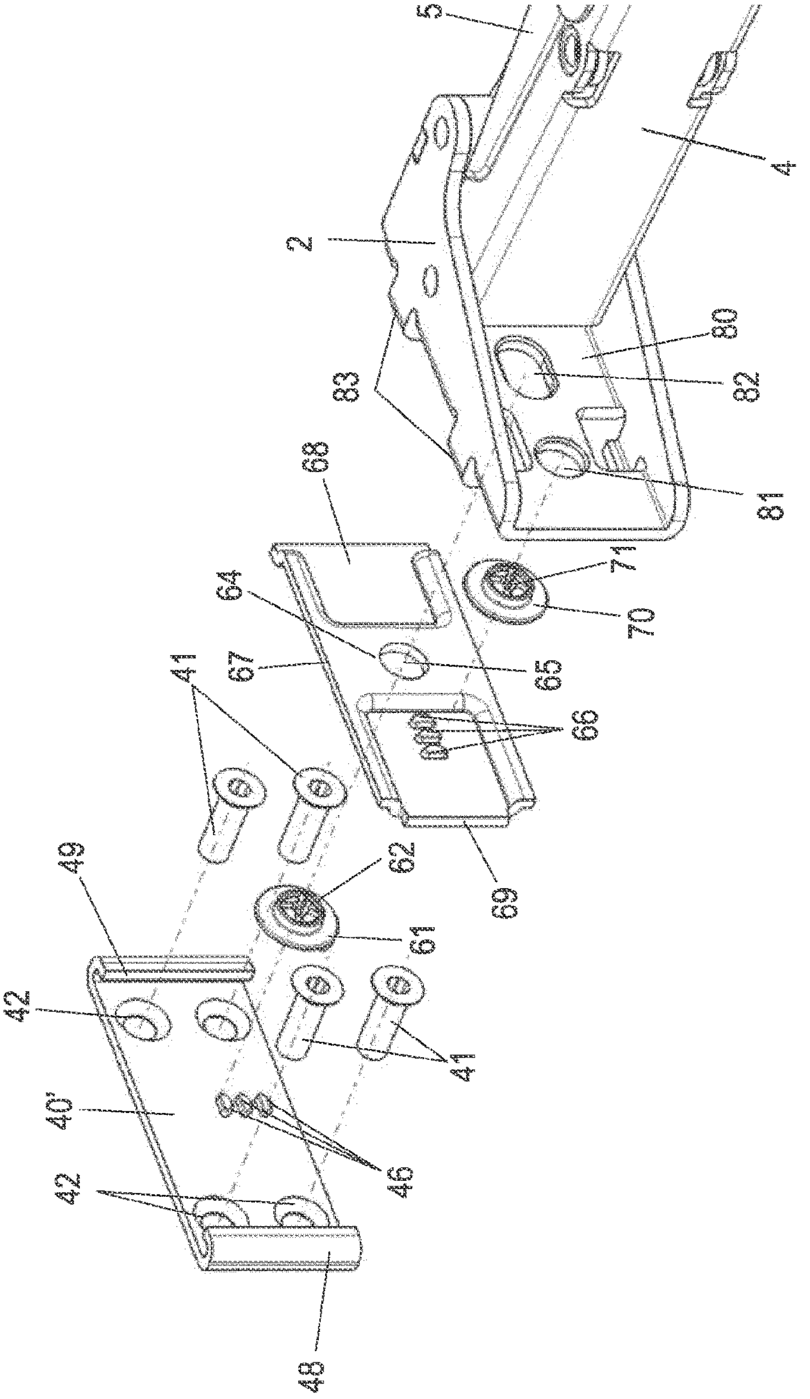
Figure 15B:
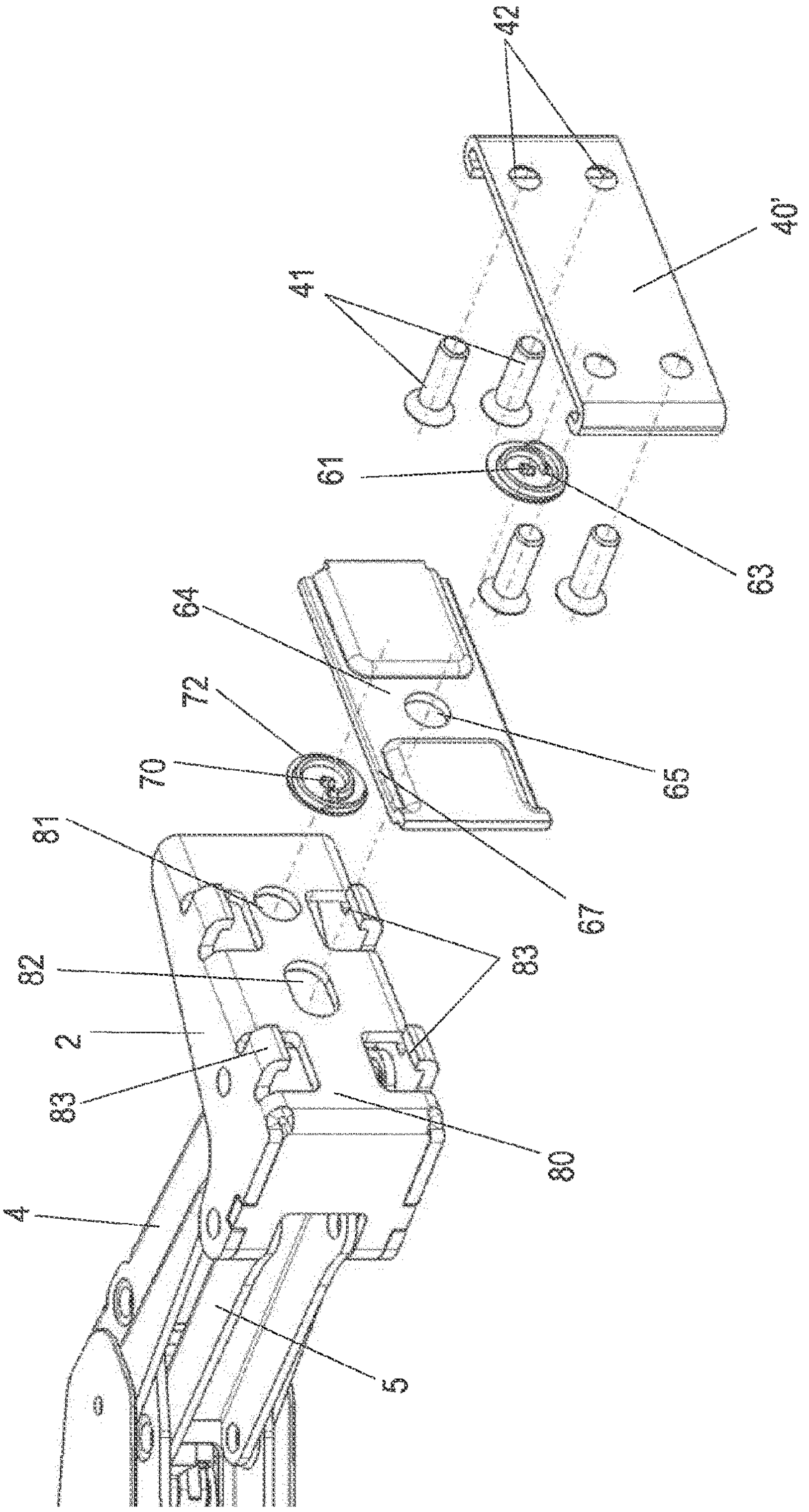
Figure 16A:
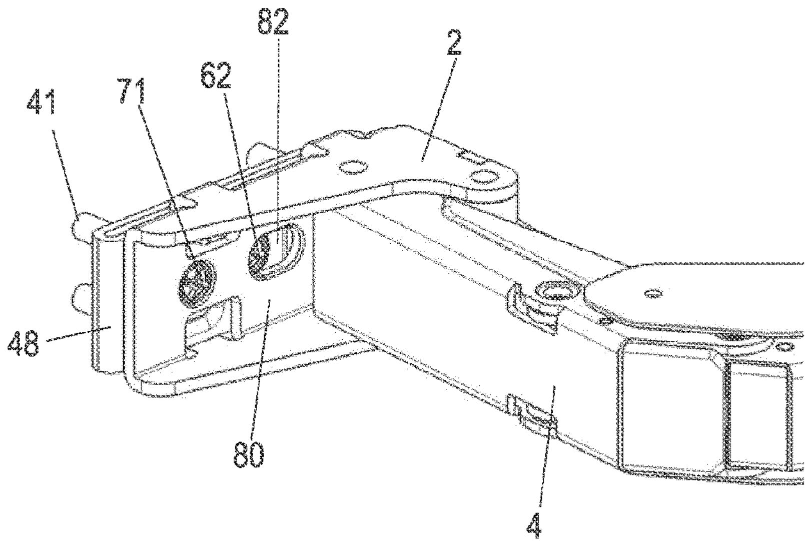
Figure 16B:
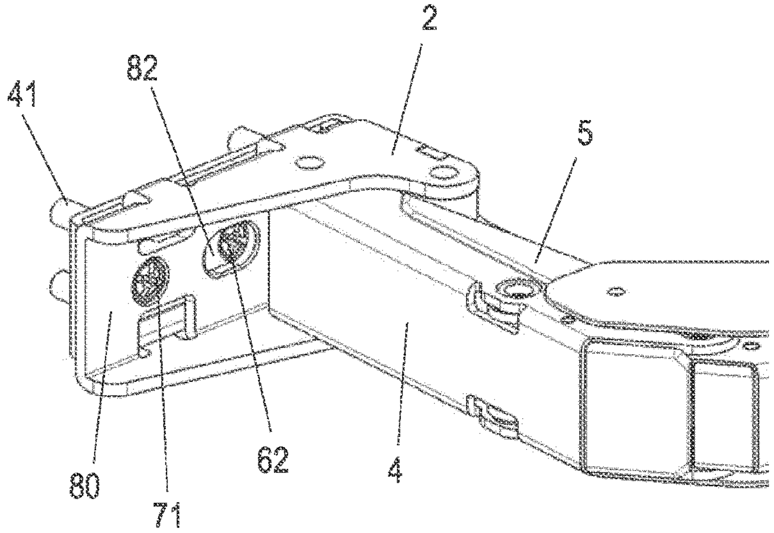
Figure 17A:
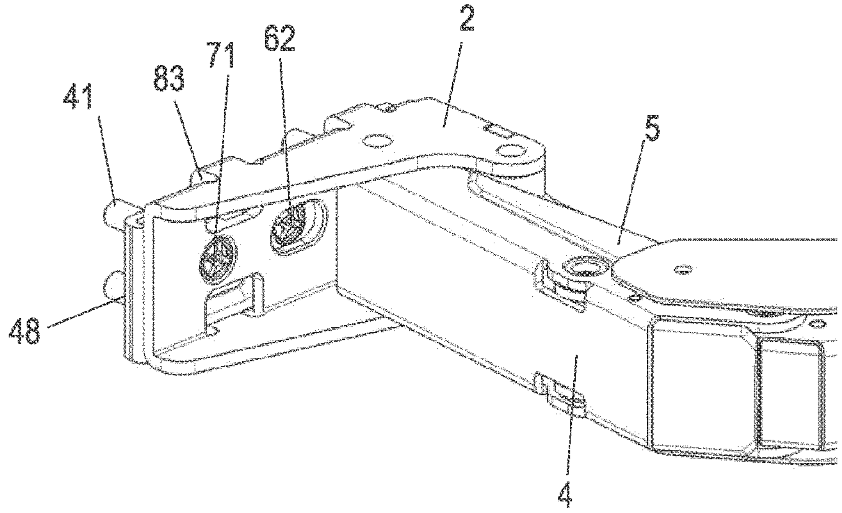
Figure 17B:
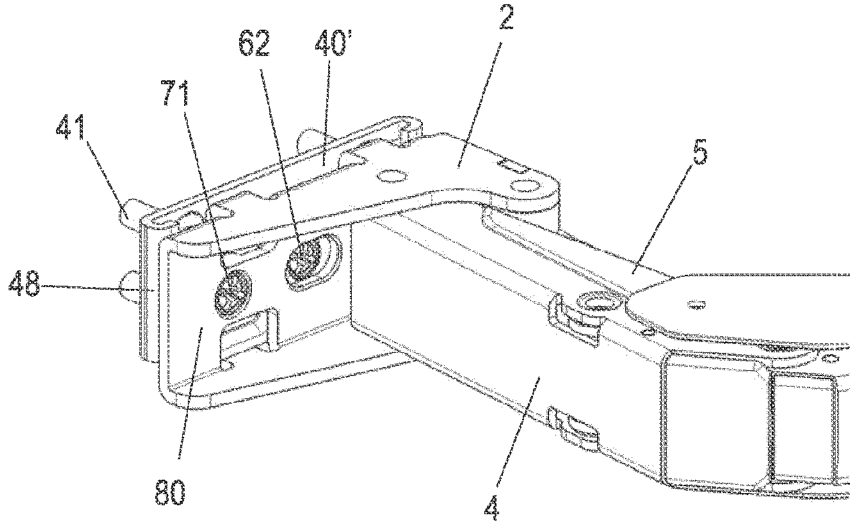
Figure 18A:
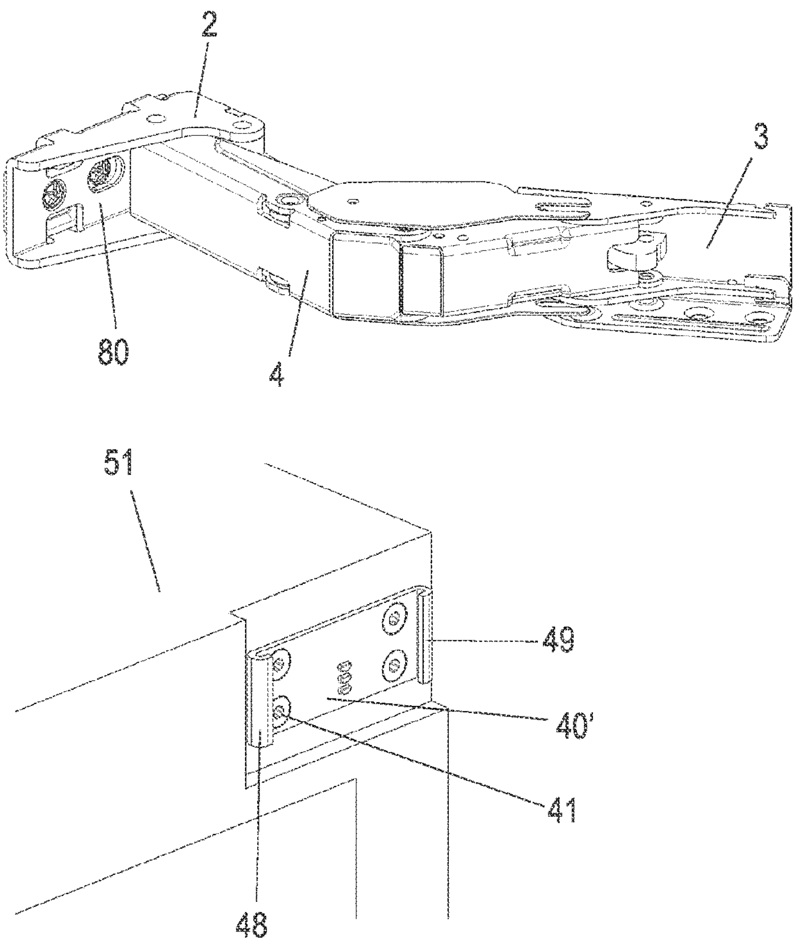
Figure 18B:
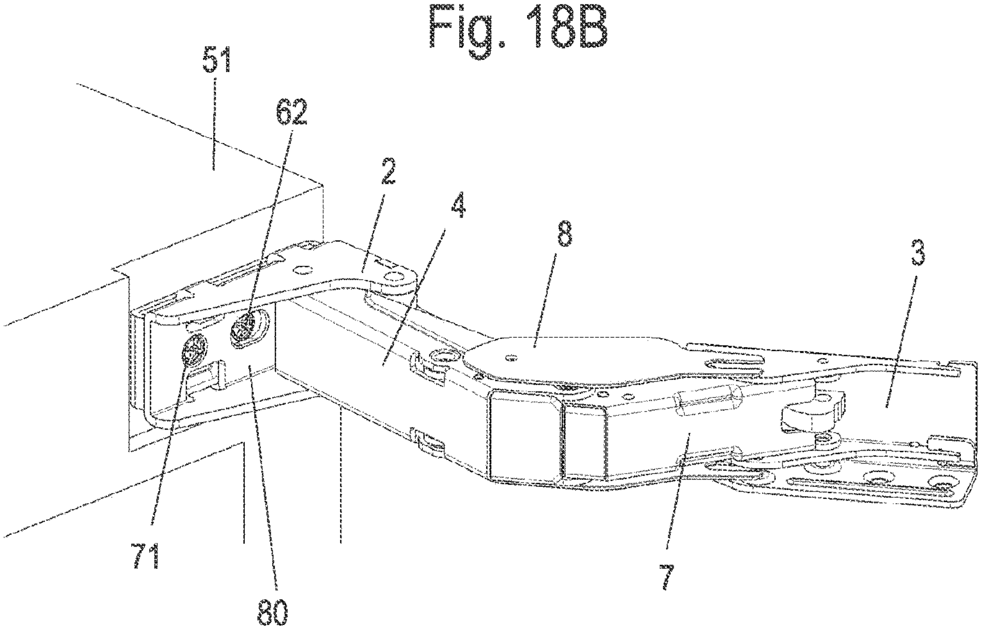
Figure 18C:
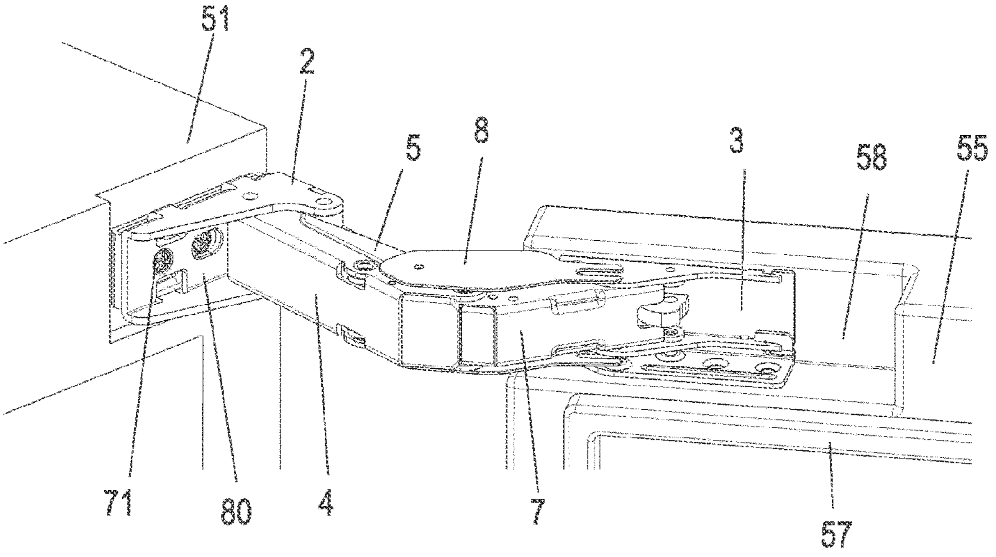

FIG. 9 A perspective view of a further example of a multi-joint hinge with an adjusting device;

FIGS. 10A and 10B Two exploded views of the multi-joint hinge adjusting device of FIG. 9;

FIGS. 11A and 11B Two views of the adjuster of FIG. 9 in different lateral positions;

FIGS. 12A and 12B Two views of the adjuster of FIG. 9 in different height positions;

FIGS. 13A to 13D Multiple views of the assembly of the multi-joint hinge with the adjusting device of FIG. 9;

FIG. 14 A perspective view of a multi-joint hinge with a modified adjusting device;

FIGS. 15A and 15B Two exploded views of the adjuster of FIG. 14;

FIGS. 16A and 16B Two views of the adjuster of FIG. 14 in different lateral positions;

FIGS. 17A and 17B Two views of the adjuster of FIG. 14 in different height positions, and FIGS. 18A to 18C Multiple views of the multi-joint hinge of FIG. 14 during assembly.

A refrigerator 50 comprises an appliance body 51 in which an upper interior 52 and a lower interior 53 are provided, which are separated from each other by a base 54. The upper interior 52 can be closed via an upper door 55, while the lower interior 53 can be closed via a lower door 56. The doors 55 and 56 can comprise compartments and holding means for storing objects in addition to insulation on the side facing the interior spaces 52 and 53. A circumferential seal 57 is also provided on each door 55 and 56 which, in the closed position, effects a seal with respect to the interior spaces 52 or 53.

The upper door 55 is pivotably held to the appliance body 51 via an upper multi-joint hinge 1 and an upper joint mechanism on a double hinge 60. The lower door 56 is pivotably held at the top by a lower joint mechanism on the double hinge 60 and at the bottom by another multi-joint hinge 1.

FIGS. 2A and 2B show a modified refrigerator 50' comprising an appliance body 51' on which two upper doors 55 and two lower doors 56 are pivotably mounted. The two upper doors 55 close an upper interior space 52' in the appliance body 51', and the two lower doors 56 close a lower interior space 53'. The interior spaces 52' and 53' are divided from each other by a floor 54'. The doors 55 are each pivotably mounted at the top via a multi-joint hinge 1 and at the bottom via a double hinge 60. The lower doors 56 are pivotably mounted at the top via the double hinge 60 and at the bottom via a further multi-joint hinge 1.

It is of course possible to mount the doors 55 and 56 on the appliance body 51 or 51' without a double hinge 60 using only two or more multi-joint hinges 1.

The refrigerators 50 or 50' can be set up as free-standing units, but can also be installed within a cabinet unit. In order to avoid a collision with side walls of a cabinet unit, the multi-joint hinges 1 and the double hinge 60 are formed in such a way that a hinge part on the doors 55 and 56 is simultaneously removed from the appliance body 51 or 51' during a pivoting motion.

FIGS. 3A and 3B show the multi-joint hinge 1 in an assembled position. The mounting element 2 is fixed to a front end face of the appliance body 51. The hinge element 3 is inserted in a recess 58 on the door 55, which is located outside the circumferential seal 57. The recess 58 allows the multi-joint hinge 1 to be at least partially integrated within the door 55 in the closed position (FIG. 3B). An upper side of the door 55 is flush with an upper side of the multi-joint hinge 1.

FIG. 4 shows an exploded view of the multi-joint hinge 1. The joint mechanism comprises four levers 4, 5, 6 and 7 which create a connection between the mounting element 2 and the hinge part 3.

The mounting element 2 is attached to the body 51 via an elongated hole 28 with fastening means, such as screws, and comprises a first axis A1 to which a first lever 4 is hingedly connected. In addition to the first axis A1, the first lever 4 comprises a second axis A2 and a fifth axis A5. A second lever 5 is hingedly connected to the mounting element 2 on a third axis A3 and comprises a fourth axis A4 at the opposite end, which is hingedly connected to a third lever 6. The third lever 6 comprises the fourth axis A4 in a central area and is connected to the first lever 4 at one end via the axis A2. On the opposite side, the third lever 6 is connected to the hinge part 3 at the sixth axis A6. The hinge part 3 is hingedly connected with a seventh axis A7 to the fourth lever 7, which is hingedly connected at the opposite end with the fifth axis A5 to the first lever 4. All levers 4, 5, 6 and 7 are made of bent sheet steel as U-shaped parts in cross-section.

The mounting element 2 comprises a height adjustment via a self-locking adjusting device. For this purpose, an axis A20 is formed by a screw 20 which passes through two legs of the mounting element and has a threaded section 21. An internally threaded insert 22 is mounted on the threaded section 21 and is non-rotatably arranged on a fastening part 24. The internally threaded insert 22 comprises two projections 23 as a stop, which are inserted into receptacles 25 of the fastening part 24. By turning the screw 20, the screw 20 with the mounting element 2 can be axially displaced relative to the internally threaded insert 22. The internally threaded insert 22 is thereby fixed to the mounting part 24, which is fixed to a device body 51 via fastening means, such as screws, which engage through an opening 26 on the mounting part 24. By turning the screw 20, the height of the mounting element 2 can thus be adjusted relative to the fastening part 24. The projections 23 on the internally threaded insert 22 serve as a stop to the mounting element 2 when it is adjusted to the end position, so that it is still possible to hang in and out on the mounting part 24 even in the maximum adjusted position. In the mounted position, the projections 23 protrude beyond the mounting part 24 in the axial direction.

The joint mechanism of the multi-joint hinge 1 further comprises a spring 10. The spring 10 is held between a first guide element 11 and a second guide element 12. The first guide element 11 is hingedly connected to the insertion element 9 at an axis A11, and the second guide element 12 is hingedly connected to a guide lever 13. The guide lever 13 is hingedly connected to the fourth lever 7 and carries a guide roller 15 which is movable along a curve guide 18 on a guide element 16. The guide element 16 is fixed to the fourth lever 7 via an opening 17 with an axis.

The fourth lever 7 comprises an insertion element 9 which can be pivoted together with the fourth lever 7 about the fifth axis A5. The insertion element 9 is fixed to the fourth lever 7 via a further axis A13. The fourth lever 7 and the insertion element 9 thus form a unit that can be moved together, whereby the insertion element 9 can optionally also be formed integrally with the fourth lever 7.

An axis A14 is formed on the insertion element 9, into which an actuating element 14 in the form of a pin is inserted. In the assembled position, the actuating element 14 can act on the front ends of piston rods 32, which can then be pushed into damper housing 31.

The multi-joint hinge 1 comprises two linear dampers 30, each with a damper housing 31 and a piston rod 32. It is also possible that only one linear damper 30 is provided. The linear damper or dampers 30 are arranged within a U-shaped lever 4. The linear damper or dampers 30 are at least partially covered laterally by the legs of the U-shaped lever 4. The linear damper(s) 30 are fixed to a holding element 33, which has two adjacent receptacles 35, into each of which a part of a damper housing 31 is inserted. The insertion depth of the damper housing 31 is limited by a stop 34. The stop 34 is formed as a stop pin and is inserted into an opening 37 of the holding element 33. The stop 34 is held at opposite ends on the first lever 4, openings 36 being formed for this purpose on the first lever 4 for insertion of one end of the stop 34. The stop 34 may also be held to the first lever 4 by other fastening means. In addition, the stop 34 does not have to pass through the opening 37 on the holding element 33, but can also extend adjacent to the holding element 33.

The holding element 33 is fixed to the fifth axis A5 via an opening and, in the installed position, is supported on and movable together with the first lever 4.

In the illustrated embodiment, the hinge part 3 is L-shaped in cross-section, wherein a mounting part 103 is fixed to the hinge part 3 so that the sixth axis A6 and the seventh axis A7 can run between a wall of the hinge part 3 and the mounting part 103.

The multi-joint hinge 1 further comprises covers 8 which, in an open position, cover gaps between the third lever 6 and the fourth lever 7, thereby forming an engagement protection. The covers 8 can be held in an articulated manner on the stop 34 and have an elongated hole guide that cooperates with a guide pin fixed to the hinge part 3.

FIGS. 5A to 5D show the multi-joint hinge 1 in different positions. In the folded closed position (FIG. 5A), the levers 4, 5, 6 and 7 of the joint mechanism are nested inside each other and the multi-joint hinge 1 is box-shaped.

Figure 5B:
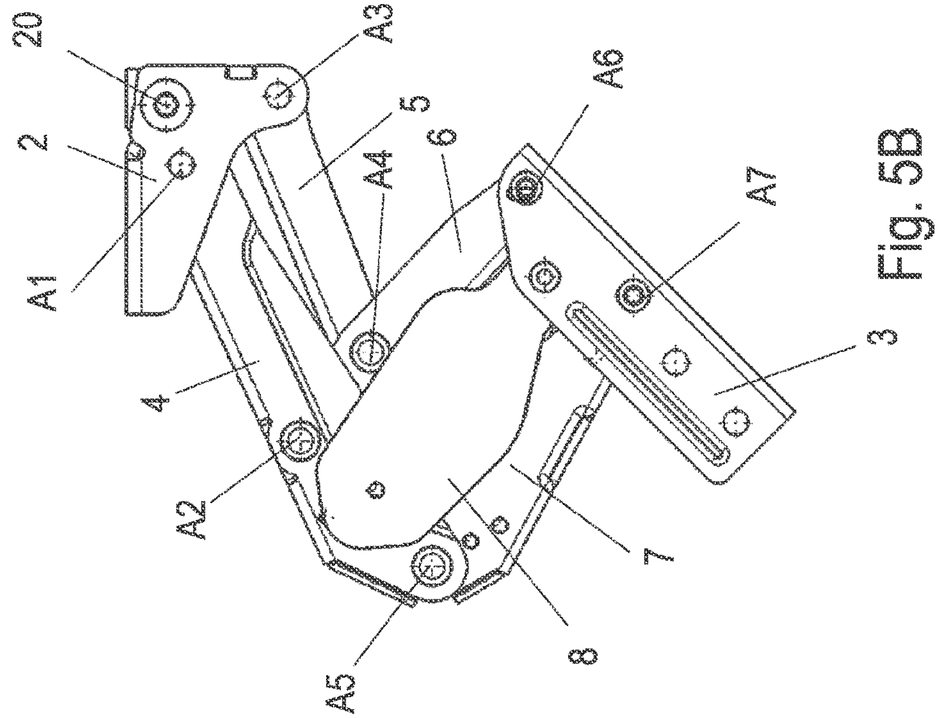
Figure 5A:
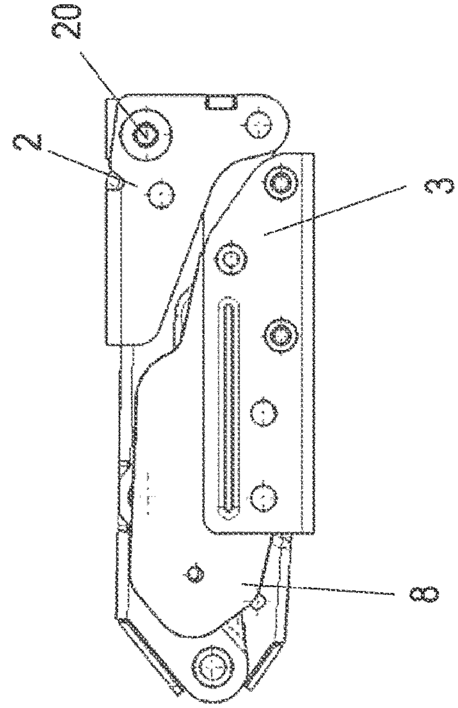
Figure 5D:
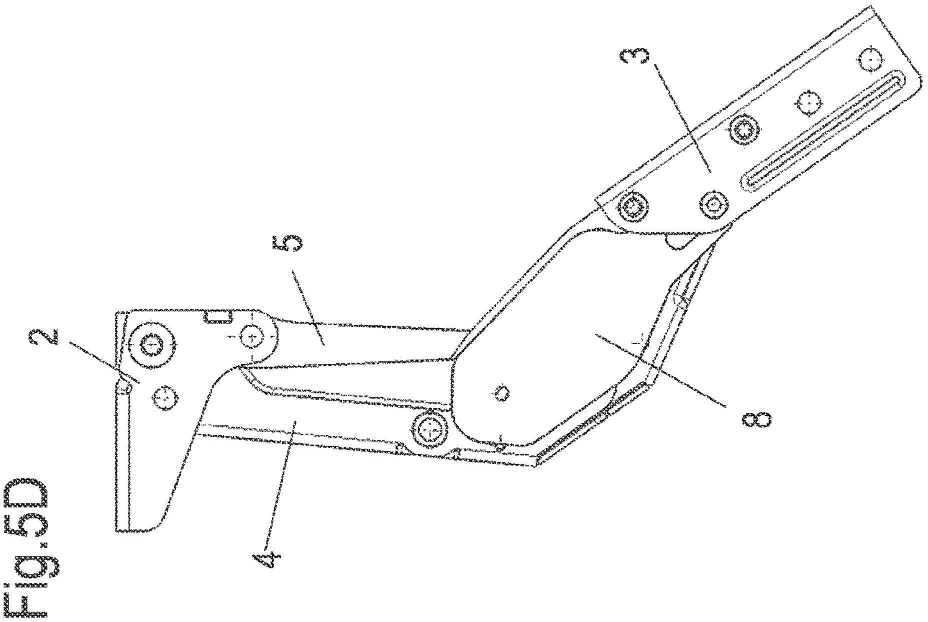
Figure 5C:
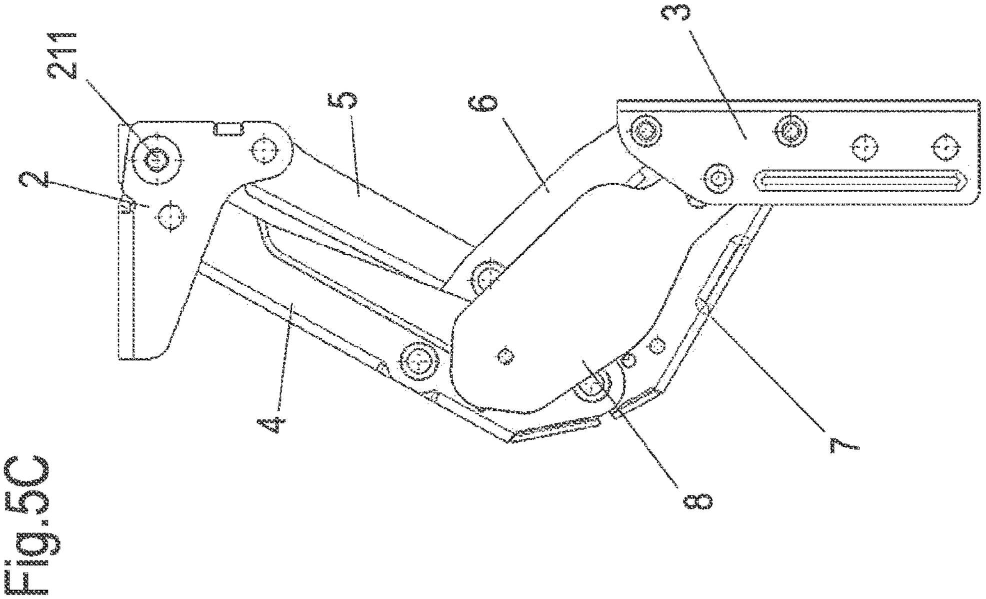

When the hinge part 3 is pivoted relative to the mounting element 2, the joint mechanism unfolds and the levers 4, 5, 6 and 7 pivot towards each other, as shown in FIGS. 5B and 5C. FIG. 5D shows the maximum opening position of hinge part 3, which is for example in a range between 100° to 150° away from the closing position. The opening angle can be determined from two parallel surfaces in the closed position of the mounting element 2 and the hinge part 3.

FIGS. 6A and 6B show the adjusting device on the mounting element 2. The mounting element 2 is U-shaped in cross-section, whereby the axes A1 and A3 are fixed to opposite legs of the mounting element 2. The screw 20 as an adjustment element is also held between the two legs, whereby the screw 20 is mounted so that it cannot be displaced in the axial direction but can rotate. The internally threaded insert 22 is mounted on the screw 20 at the threaded section 21. The adjusting screw 20 is inserted into the receptacles 25 of the fastening part 24 and is rotatably held. If the screw 20 is turned, the mounting element 2 is thereby displaced in the axial direction of the screw 20, whereby the internally threaded insert 22 remains stationary on the mounting part 24.

The internally threaded insert 22 has two radially projecting flanges 29. The flanges 29 form an anti-rotation device with respect to the mounting element 2 and form a contact surface to the two webs of the fastening part 24. The projections 23 of the internally threaded insert 22 limit the adjustment in axial direction. In the maximum adjustment positions, the mounting element 2 can still be mounted and dismounted.

FIG. 6A shows the assembled position with a fastening means in the form of a screw 27 passing through the mounting part 24. An elongated hole 28 at a bottom of the mounting element 2 is also penetrated by a screw 27. The elongated hole 28 extends with the longitudinal direction parallel to the axial direction of the screw 20.

FIGS. 7A to 7C show different positions of the fastening part 24 on the mounting element 2. FIG. 7A shows a central position in which the U-shaped fastening part 24 is arranged with its two webs at a distance from the two legs of the mounting element 2. By turning the screw 20, the fastening part 24 can be lowered, as shown in FIG. 7B, so that the fastening part 24 is positioned adjacent to the lower leg of the mounting element 2. If the screw 20 is turned in the opposite direction, the fastening part 24 can be arranged adjacent to the upper leg, as shown in FIG. 7C. The fastening part 24 does not come into direct contact with the mounting element 2 and only has contact with the adjusting screw 20 and the internally threaded insert 22. The end stop of the adjustment results from the projections 23 on the internally threaded insert 22 as described above.

FIG. 8A shows the assembly of the multi-joint hinge 1. In a first step, the fastening part 24 is fixed to the appliance body 51 by means of a screw 27. The multi-joint hinge 1 can now be fitted onto the fastening part 24, whereby the internally threaded insert 22 is inserted between the two webs with the receptacles 25 of the fastening part 24. A height adjustment can now be made, as shown with reference to FIGS. 7A to 7C. After aligning the mounting element 2 at the desired height, the adjusted position is now fixed, whereby a fastener in the form of a screw 27 can be screwed into the elongated hole 28 to fix the mounting element 2 to the appliance body 51. Furthermore, the door 55 can be fixed to the hinge part 3.

In the illustrated embodiment example, the adjustment mechanism serves to adjust the height of the multi-joint hinge 1. It is of course also possible to adjust the mounting element 2 in another direction relative to the fastening part 24, for example for depth adjustment or lateral adjustment. Such adjustment mechanisms can also be provided in addition to height adjustment.

In the embodiment shown, the fastening part 24 and the internally threaded insert 22 are formed as two separate components. It is also possible to combine these two components into one.

FIG. 9 shows the multi-joint hinge 1 with a modified adjusting device which can adjustably fix the mounting element 2 of the multi-joint hinge 1 to an appliance body 51. The adjusting device allows the mounting element 2 to be adjusted in two different directions, in particular for height and lateral adjustment.

The adjusting device is shown in detail in FIGS. 10A and 10B. The adjusting device comprises a mounting plate 40 which can be fixed to an appliance body 51 by fastening means 41, in particular screws. Openings 42 are provided on the mounting plate 40 for this purpose. The mounting plate 40 has bent-over guide webs 43 on opposite sides, which are integrally formed with a latching web 44 at one end.

A base plate 45 is fixable to the mounting plate 40, which comprises a plurality of projections 46 on a plate-shaped section, which can be brought into engagement with an adjustment element. Recesses 47 are provided on opposite longitudinal sides of the base plate 45. On opposite front ends, bent-over guide elements 48 and 49 are provided. A plate-shaped adjustment element 64 can be guided on the guide elements 48 and 49, which has guide rails 67 on opposite longitudinal sides, which are arranged at a distance from the longitudinal edges of the base plate 45. Several projections 66 are formed on the adjustment element 64, which can be brought into engagement with an adjustment element. The adjustment element 64 has an edge 68 and 69 on opposite end faces respectively, which are embraced by the guide elements 48 and 49 of the base plate 45 in the assembled position. This means that the adjustment element 64 is guided linearly on the base plate 45, although other guide means can also be provided.

An opening 65 is cut out on the adjustment element 64, on which an adjustment element 61 with a tool insert 62 is rotatably mounted. One or more worms 63 are formed on the adjustment element 61 on the side facing the base plate 45, which are in engagement with the projections 46 on the base plate 45, so that the adjustment element 64 can be moved parallel to the guide elements 48 and 49 by rotating the adjustment element 61.

Between the adjustment element 64 and the mounting element 2, a further adjustment element 70 is provided, which is rotatably mounted with a tool insert 71 in an opening 81 on a base 80 of the mounting element 2. The mounting element 2 is U-shaped in cross-section and, in addition to the opening 81, an elongated hole 82 is provided on the base 80 through which the tool insert 62 of the adjustment element 61 is accessible. At least one worm 72 is formed on the adjustment element 70 on the side facing the adjustment element 64, which worm engages with the projections 66, so that by rotating the adjustment element 70 the mounting element 2 can be displaced in the longitudinal direction of the guide rails 67 on the adjustment element 64. In FIGS. 11A and 11B, two positions of the mounting element 2 are shown to illustrate lateral adjustment. In the lateral adjustment for the mounting element 2, the fitter can use a tool to rotate the adjustment element 70 over the tool insert 71, which is rotatably held in the opening 81. By turning the adjustment element 70, the mounting element 2 is displaced laterally via the engagement with the projections 66, whereby the mounting element 2 engages around the guide strips 67 on the adjustment element 64 via guide elements 83. The guide elements 83 are hook-shaped webs, but can also be formed by other guide elements.

FIGS. 12A and 12B show an example of the height adjustment for the mounting element 2. For height adjustment, the assembler can engage the tool insert 62 of the adjustment element 61 with a tool through the elongated hole 82 to rotate the adjustment element 61 so that the worm 63 is rotated relative to the projections 46 on the base plate 45. This causes the mounting element 2 to move in the height direction. By rotating the adjustment elements 61 and 70, an adjustment travel between 2 mm to 20 mm, in particular 4 mm to 10 mm, can be realised.

Figure 13A:
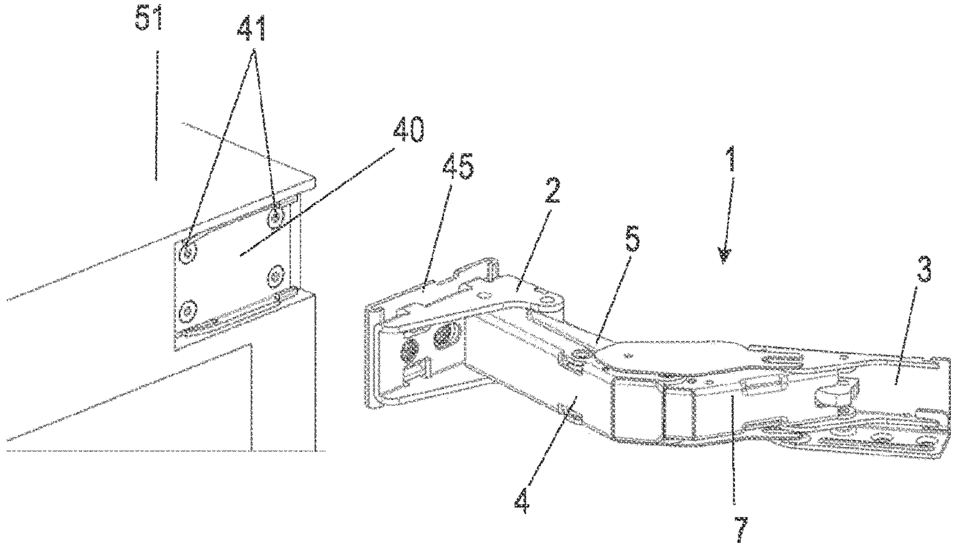
Figure 13B:
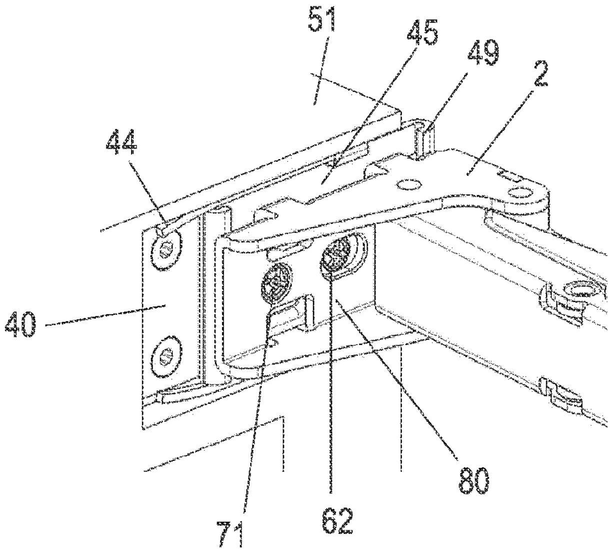
Figure 13C:
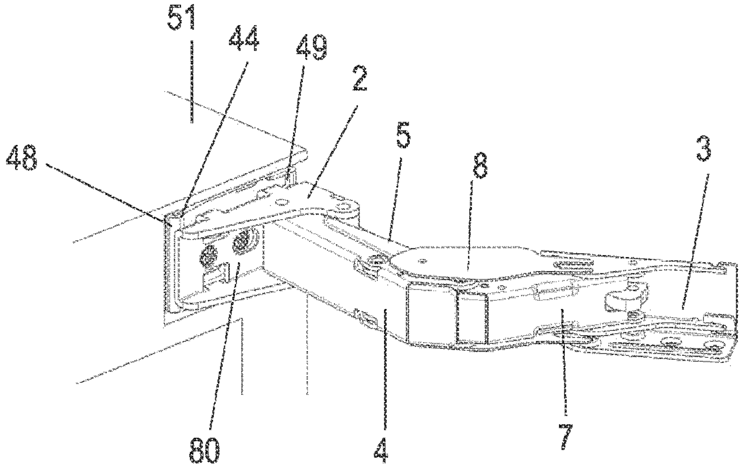
Figure 13D:
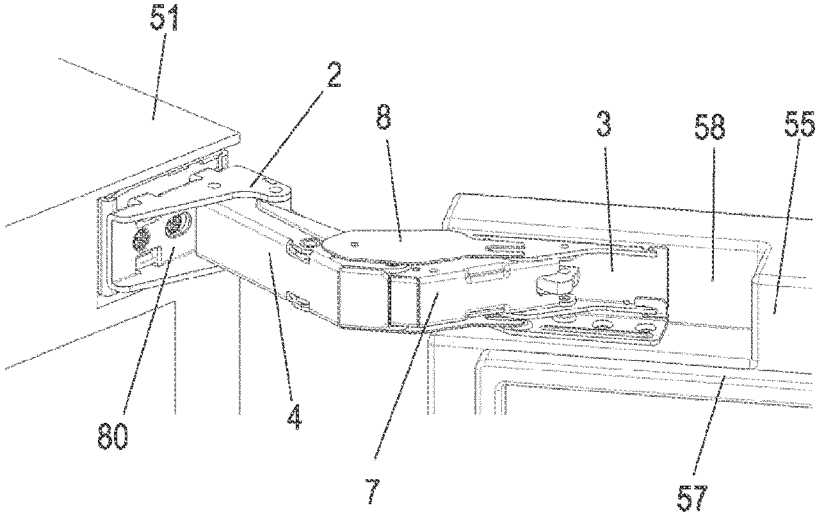

In the following, the assembly of the multi-joint hinge 1 with the adjusting device according to FIG. 9 is explained with reference to FIGS. 13A to 13D. The mounting plate 40 is fixed to the appliance body 51 by the fastening means 41. The adjustment element 64 and the base plate 45 are pre-assembled on the mounting element 2 of the multi-joint hinge 1, and the base plate 45 is now placed on the mounting plate 40, whereby the recesses 47 are arranged on the thickenings on the guide webs 43, as shown in FIG. 13B. In the next step, the base plate 45 is moved between the two guide webs 43 so that the latching webs 44 are deflected until the latching webs 44 latch behind the guide elements 48, as shown in FIG. 13C. By moving the base plate 45, the guide webs 43 grip around the base plate 45 and secure it against lifting off. The latching webs 44 prevent the base plate 45 from sliding to the right in FIG. 13C and the guide element 49 can engage with the thickening on the guide web 43 so that the base plate 45 is secured against lifting and sliding.

The fitter can now make a lateral adjustment and a height adjustment by turning the adjustment elements 61 and 70, as described above. In addition, the door 55 is fixed to the hinge part 3, whereby the hinge part 3 is arranged in a recess 58 outside a circumferential seal 57.

FIG. 14 shows a multi-joint hinge 1 with a modified adjusting device. The adjusting device is arranged on the mounting element 2 and is shown in detail in FIGS. 15A and 15B.

Instead of the two-part design of mounting plate 40 and base plate 45, a base plate 40' is provided which on the one hand has openings 42 which can be fixed to an appliance body via fastening means 41 and on the other hand has projections 46 which can be brought into engagement with the adjustment element 61. The base plate 40' has guide elements 48 and 49 on opposite end faces for guiding the plate-shaped adjustment element 64, the edges 68 and 69 of which are embraced by the guide elements 48 and 49. The adjustment of the mounting element 2 relative to the cover element 64 via the adjustment element 70 is designed as in the previous embodiment example.

FIGS. 16A and 16B show an example of the lateral adjustment of the mounting element 2 relative to the base plate 40'. By turning the adjustment element 70, the mounting element 2 moves relative to the adjustment element 64, whereby the guide elements 83 engage around the guide strips 67.

FIGS. 17A and 17B show the height adjustment of the adjusting device, in which a relative movement between the adjustment element 64 and the mounting plate 40' takes place by rotating the adjustment element 61.

FIGS. 18A to 18C show the assembly of the adjusting device with the multi-joint hinge 1 of FIG. 14. In a first step, the modified base plate 40' is fixed to the appliance body 51 via fastening means 41. Then the mounting element 2 with the pre-assembled adjustment element 64 is placed on the mounting plate 40' from above and moved along the guide elements 48 and 49 until the adjustment element 61 abuts against the projections 46. The guide elements 48 and 49 thereby embrace the edges 68 and 69 of the adjustment element 64 and prevent it from lifting off. In the next step, the adjustment element 61 can be rotated to align the mounting element 2 with the adjustment element 64 in the vertical direction. When the desired vertical position is reached, the adjustment element 70 can be rotated to optionally make a lateral adjustment. Furthermore, the door 55 is mounted to the hinge part 3. The alignment of the door 55 can also be done in the mounted position.

The embodiments according to FIGS. 9 and 14 can also be combined with the adjusting device according to FIG. 4, for example, only one adjustment element can be designed as a worm, while the other adjustment element is designed as a screw or spindle. It is possible to extend the height adjustment according to FIG. 4 by a lateral adjustment.

LIST OF REFERENCE SIGNS

1 Multi-joint hinge
2 Mounting element
3 Hinge part
4 Lever
5 Lever
6 Lever
7 Lever
8 Cover
9 Insertion element
10 Spring
11 Guide element
12 Guide element
13 Guide lever
14 Actuating element
15 Guide roller
16 Guide element
17 Opening
18 Curve guide
20 Screw
21 Threaded section
22 Internally threaded insert
23 Projection
24 Mounting part
25 Receptable
26 Opening
27 Screw
28 Elongated hole
29 Flange
30 Linear damper
31 Damper housing
32 Piston rod
33 Holding element
34 Stop
25 Receptable
36 Opening
37 Opening
40 Mounting plate
40' Base plate
41 Fasteners
42 Opening
43 Guide web
44 Latching web
45 Base plate
46 Projection
47 Recess
48 Guide element
49 Guide element
50, 50' Refrigerator
51, 51' Appliance body
52, 52' Interior
53, 53' Interior
54, 54' Floor
55 Door
56 Door
57 Seal
58 Recess
60 Double hinge
61 Adjusting organ
62 Tool insert
63 Worm
64 Adjustment element
65 Opening
66 Projection
67 Guide rail
68 Edge
69 Edge
70 Adjustment part
71 Tool insert
72 Worm
80 Floor
81 Opening
82 Elongated hole
83 Guide element
103 Mounting part
A1 Axis
A2 Axis
A3 Axis
A4 Axis
A5 Axis
A6 Axis
A7 Axis
A11 Axis A13 Axis
A14 Axis
A20 Axis

The invention claimed is:

1. A refrigerator (50, 50') comprising an appliance body (51, 51') and at least one door (55, 56) which is pivotably mounted on the appliance body (51, 51') and which is held pivotably between a closed position and a maximum opening position via at least one multi-joint hinge (1) and in the closed position bears against the appliance body (51, 51') via at least one seal (57), wherein the at least one multi-joint hinge (1) comprises a mounting element (2) held on the appliance body (51, 51'), a hinge part (3) fixed to the door (55, 56), and a joint mechanism having a plurality of joint levers (4, 5, 6, 7), wherein the mounting element and hinge part are supported pivotably against one another via the joint mechanism, wherein an adjusting device is provided on the mounting element (2), said adjusting device comprising a fastening part (24) fixed to the appliance body (51, 51') and an adjustment element (20) by means of which a position of the mounting element (2) relative to the fastening part (24) can be adjusted in at least one spatial direction, and wherein the mounting element (2) is U-shaped in cross-section and the fastening part (24) is adjustable between two legs of the mounting element (2).

2. The refrigerator according to claim 1, wherein the adjustment element is configured to execute a rotational pivoting motion and a translational motion of the mounting element (2) can be effected via the rotational motion.

3. The refrigerator according to claim 1, wherein the adjusting device is self-locking.

4. The refrigerator according to claim 1, wherein the adjustment element (20) comprises a threaded portion (21) which comprises at least one thread selected from the group consisting of: flat thread, cylindrical thread and conical thread and wherein the mounting element (2) is continuously adjustable.

5. The refrigerator according to claim 1, wherein the adjustment element (20) is rotatable but axially non-displaceable.

6. The refrigerator according to claim 1, wherein an internally threaded insert (22) is arranged on the adjustment element (20) and is held in a rotationally fixed manner on the fastening part (24).

7. The refrigerator according to claim 1, wherein the adjusting device is formed for height adjustment of the mounting element (2) relative to the fastening part (24).

8. The refrigerator according to claim 1, wherein the mounting element (2) comprises an elongated hole (28) which is aligned parallel to a direction of adjustment and through which a fastening means (27) passes in the mounted position.

9. The refrigerator according to claim 1, wherein the at least one multi-joint hinge (1, 60) is arranged on the mounting element (2).

10. The refrigerator according to claim 1, wherein the adjustment element (20) comprises a tool receptacle for adjusting the position of the mounting element (2).

11. The refrigerator according to claim 1, wherein the multi-joint hinge (1) is formed as a seven-joint hinge with four levers (4, 5, 6, 7).

12. The refrigerator according to claim 1, wherein the multi-joint hinge (1) comprises at least one linear damper (30) with a damper housing (31) and a displaceable piston rod (32), which is arranged on one of the levers (4) of the joint mechanism via a holding element (33) and the piston rod (32) can be pushed into the damper housing (31) via an actuating element (14).

13. The refrigerator according to claim 1, wherein the levers (4, 5, 6, 7) are formed to engage with each other in at least one closed position.

14. The refrigerator according to claim 1, wherein the multi-joint hinge (1) comprises a spring (10) which biases the hinge part (3) in a contraction range in the closing direction.

15. The refrigerator according to claim 1, wherein the adjusting device enables the mounting element (2) to be adjusted in at least two different directions.

16. The refrigerator according to claim 1, wherein the adjusting device comprises at least one rotatable worm (63, 72).

17. The refrigerator according to claim 1, wherein the adjusting device comprises a base plate (40', 45) fixed to the appliance body (51) and at least one adjustment element (45, 64) between the mounting element (2) and the base plate (40', 45).

18. The refrigerator according to claim 17, wherein the mounting element (2) with guide elements (83) engages around the adjustment element (64) and is held displaceably on the at least one adjustment element (64).

19. The refrigerator according to claim 17, wherein at least one opening (81, 82) is provided on the mounting element (2) at a base (80), in which opening a worm (63, 72) is rotatably mounted.

* * * * *